(12) United States Patent
Gilchrist et al.

(10) Patent No.: US 12,319,516 B2
(45) Date of Patent: Jun. 3, 2025

(54) OVERHEAD LABWARE TRANSPORT SYSTEM

(71) Applicant: HighRes Biosolutions, Inc., Beverly, MA (US)

(72) Inventors: Ulysses Gilchrist, Reading, MA (US); Andrew Bennett, Beverly, MA (US)

(73) Assignee: Symbotic LLC, Wilmington, MA (US)

(*) Notice: Subject to any disclaimer, the term of this patent is extended or adjusted under 35 U.S.C. 154(b) by 0 days.

(21) Appl. No.: 18/588,939

(22) Filed: Feb. 27, 2024

(65) Prior Publication Data
US 2024/0246777 A1    Jul. 25, 2024

Related U.S. Application Data

(63) Continuation of application No. 17/662,375, filed on May 6, 2022, now Pat. No. 11,912,512.
(Continued)

(51) Int. Cl.
*B65G 47/90* (2006.01)
*B65G 1/04* (2006.01)
(Continued)

(52) U.S. Cl.
CPC .............. *B65G 47/905* (2013.01); *B65G 1/04* (2013.01); *B65G 43/08* (2013.01); *B65G 47/52* (2013.01);
(Continued)

(58) Field of Classification Search
CPC .......... B65G 47/60; B65G 1/04; B65G 17/20; B65G 37/02; B65G 47/52; B65G 49/06; B65G 47/905; B65G 43/08; B01L 3/00
See application file for complete search history.

(56) References Cited

U.S. PATENT DOCUMENTS

| 4,958,716 A | * | 9/1990 | Matsuo | ................ | B65G 54/02 |
| | | | | | 198/465.1 |
| 5,351,801 A | | 10/1994 | Markin et al. | | |
| | | | (Continued) | | |

FOREIGN PATENT DOCUMENTS

| WO | 1996025712 | 8/1996 |
| WO | 2007037397 | 4/2007 |

OTHER PUBLICATIONS

International Search Report, International Application No. PCT/US2022/072272 dated Nov. 18, 2022.

*Primary Examiner* — James R Bidwell
(74) *Attorney, Agent, or Firm* — Perman & Green, LLP

(57) ABSTRACT

A selectably configurable modular labware transport system including a labware bulk overhead transport system module forming an overhead transport path. The labware bulk overhead transport system module has a labware support, with at least a movable part of the labware support being configured to support labware thereon, and move longitudinally defining the overhead transport path. The labware support has more than one labware holding stations for holding a labware piece, each of the labware holding stations having a different location along the labware support and overhead transport path. The labware bulk overhead transport system module is communicably couplable to another labware bulk overhead transport system module that forms another different overhead transport path, and effects undisrupted transport of the labware throughout the overhead transport path with the labware bulk overhead transport system module both coupled to and uncoupled from the other labware bulk overhead transport system module.

34 Claims, 16 Drawing Sheets

Related U.S. Application Data

(60) Provisional application No. 63/188,172, filed on May 13, 2021.

(51) Int. Cl.
*B65G 43/08* (2006.01)
*B65G 47/52* (2006.01)

(52) U.S. Cl.
CPC ... *B01L 2200/18* (2013.01); *B65G 2201/0238* (2013.01); *B65G 2201/0244* (2013.01); *B65G 2201/025* (2013.01); *B65G 2203/0208* (2013.01)

(56) References Cited

U.S. PATENT DOCUMENTS

| | | | |
|---|---|---|---|
| 5,402,875 A * | 4/1995 | Markin | G01N 35/04 198/468.2 |
| 5,934,444 A * | 8/1999 | Kierpaul | B65G 37/02 198/465.4 |
| 6,056,106 A | 5/2000 | Van Dyke, Jr. et al. | |
| 6,877,944 B2 | 4/2005 | Peiter | |
| 7,597,848 B1 | 10/2009 | Ameling et al. | |
| 7,780,020 B2 | 8/2010 | Yoshitaka | |
| 8,348,588 B2 | 1/2013 | Yoshida et al. | |
| 8,822,224 B2 * | 9/2014 | Markin | G01N 35/04 436/43 |
| 9,482,684 B2 * | 11/2016 | Johns | G01B 11/02 |
| 9,688,479 B1 * | 6/2017 | Gorski | B65G 47/682 |
| 9,927,451 B2 | 3/2018 | Pollack et al. | |
| 11,912,512 B2 * | 2/2024 | Gilchrist | B65G 43/08 |
| 2004/0109746 A1 | 6/2004 | Suzuki | |

* cited by examiner

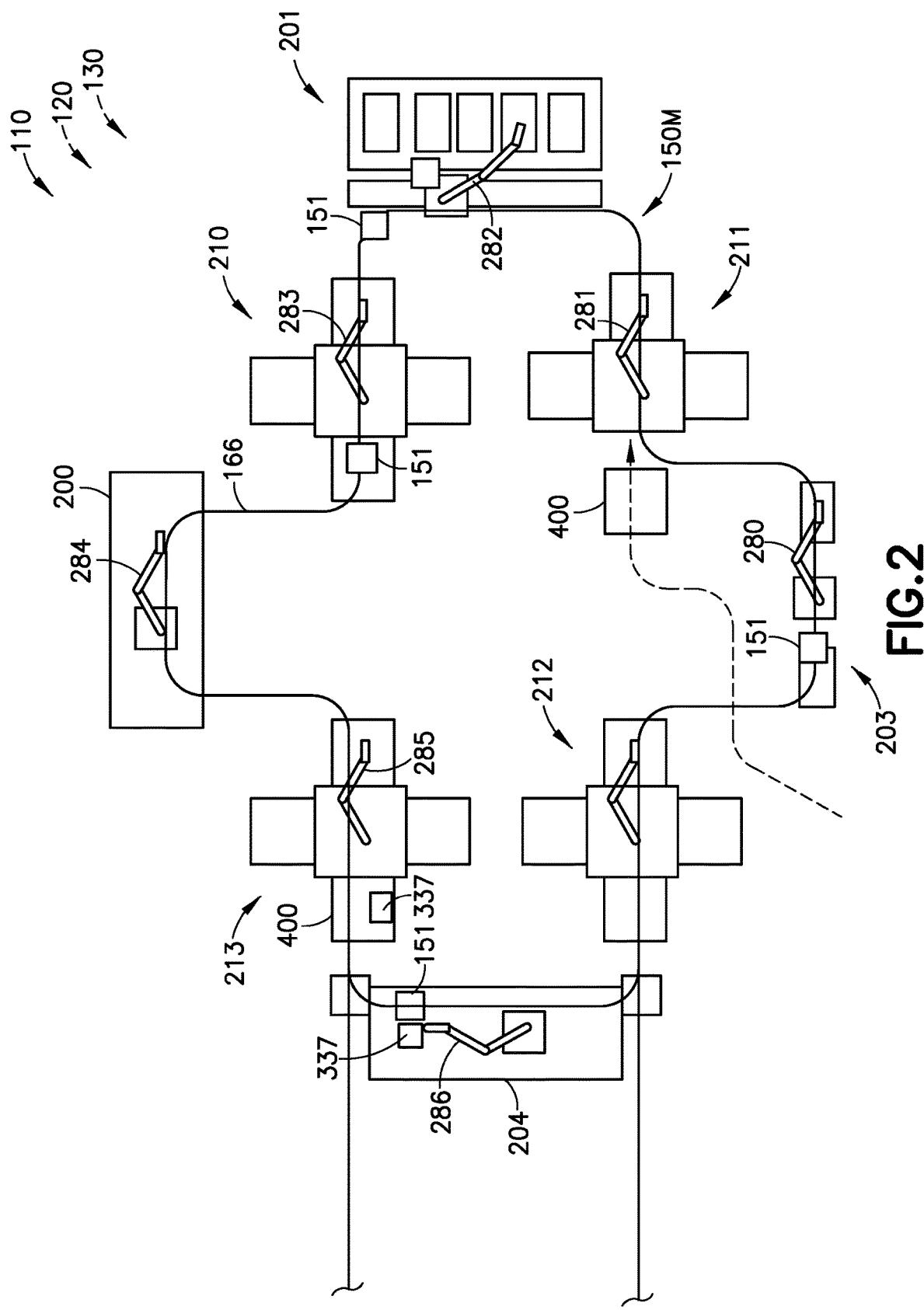

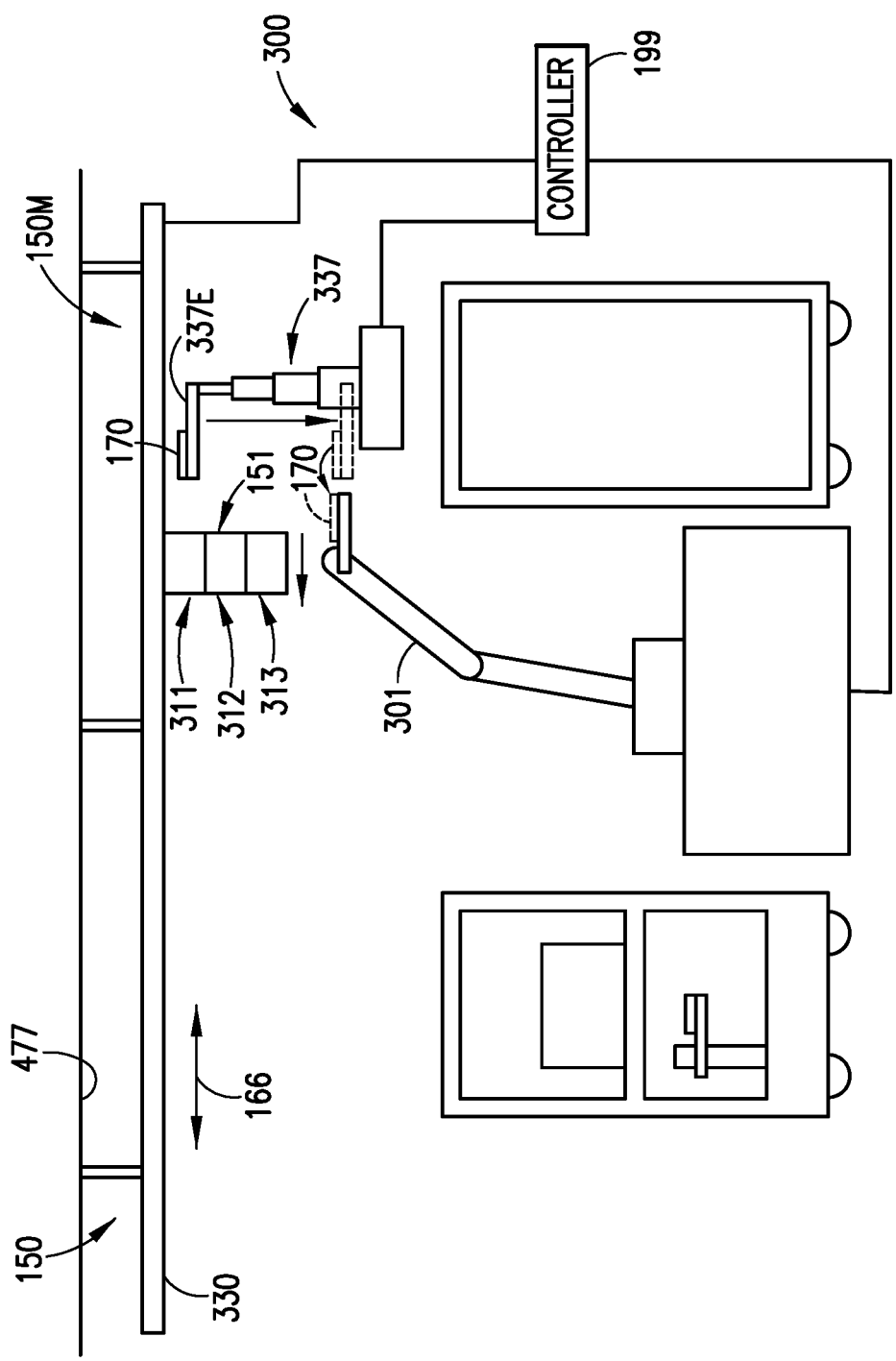

OVERHEAD LABWARE TRANSPORT SYSTEM

CROSS-REFERENCE TO RELATED APPLICATIONS

This application is a continuation of U.S. application Ser. No. 17/662,375, filed May 6, 2022, (now U.S. Pat. No. 11,912,512, which is a non-provisional of and claims the benefit of U.S. provisional patent application No. 63/188,172 filed on May 13, 2021, the disclosures of which are incorporated herein by reference in their entireties.

BACKGROUND

1. Field

The exemplary embodiments generally relate to life sciences equipment, and more particularly, to automated handling and processing of life sciences processing equipment.

2. Brief Description of Related Developments

Generally, laboratory processing equipment are disposed on a laboratory facility floor where conveyor type connections transport labware between the laboratory processing equipment. These conveyor type connections are mounted to the floor and are disposed at waist height so as to be intertwined with (e.g., serpentined between and/or extending along/coupled to sides of) the laboratory processing equipment throughout the labware space such as to block direct access to portions of the laboratory processing equipment where such blockage makes servicing and maintaining the laboratory processing equipment difficult. The conveyor type connections between the laboratory processing equipment also hinder travel (e.g., of laboratory personnel) throughout the laboratory facility and reconfiguration of the laboratory processing equipment within the laboratory facility.

BRIEF DESCRIPTION OF THE DRAWINGS

The foregoing aspects and other features of the disclosed embodiment are explained in the following description, taken in connection with the accompanying drawings, wherein:

FIG. 2 is a schematic plan view of a lab illustrated FIG. 1 in accordance with aspects of the disclosed embodiment;

FIGS. 3B, 3C, 3D, 3E, and 3F are schematic elevation views of a portion of the lab illustrated in FIG. 2 in accordance with aspects of the disclosed embodiment;

DETAILED DESCRIPTION

Figures 1, 1A:
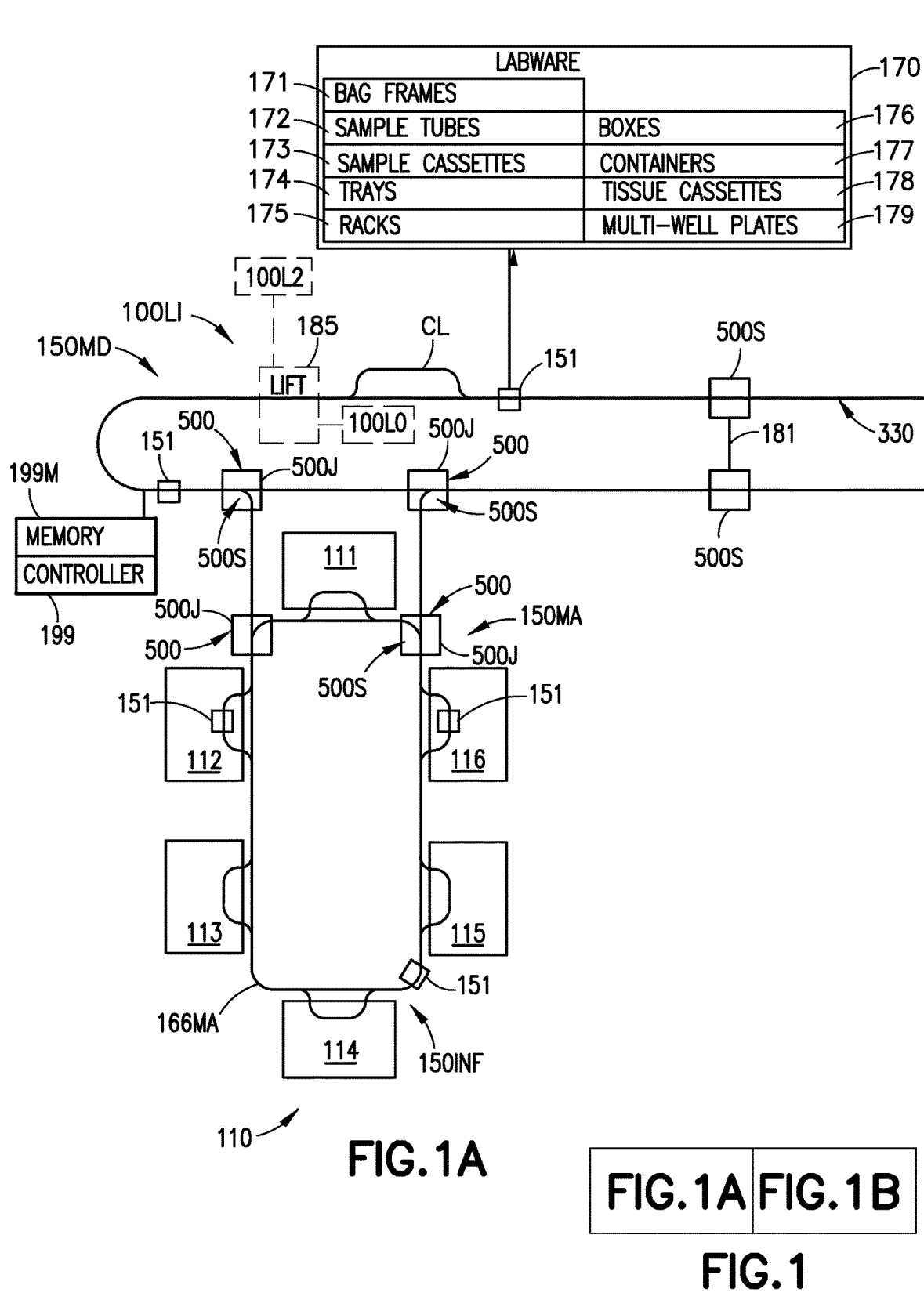
FIG. 1 is (Comprising of FIGS. 1A-1B) a schematic plan view of a laboratory facility having multiple labs communicably coupled by at least one labware bulk overhead transport system module in accordance with aspects of the disclosed embodiment.
Figure 1B:
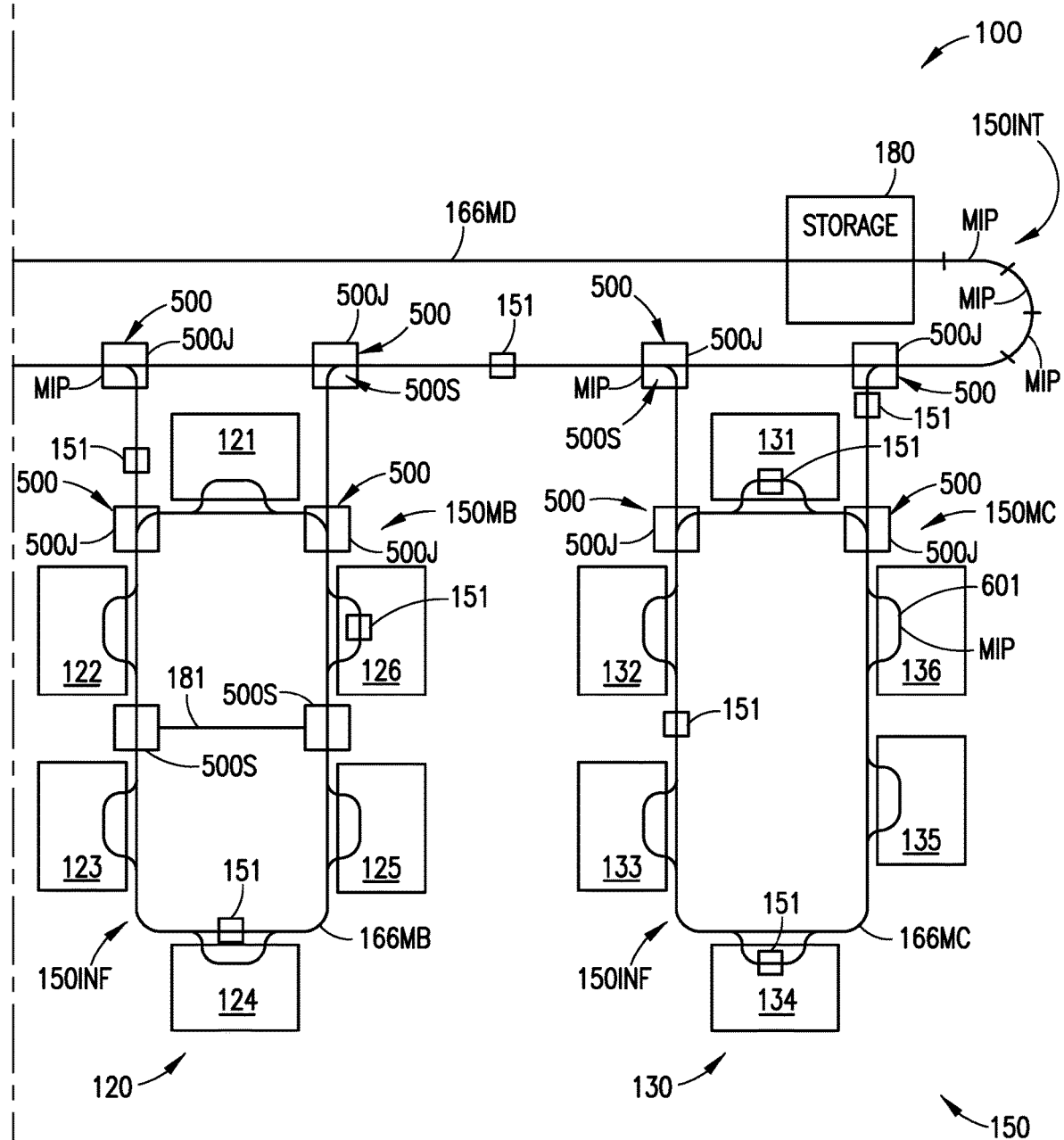

FIG. 1 is a schematic plan view of a laboratory facility 100 having multiple labs 110, 120, 130 communicably coupled by at least one labware bulk overhead transport system module 150M of a modular labware transport system 150 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

The aspects of the present disclosure provide for a labware bulk overhead transport system module 150M of the modular labware transport system 150 that communicably connects (e.g., so as to transport labware 170 therebetween) at least one integrated labware process machine/appliance (referred to herein as an integrated labware process machine) or standalone/benchtop instrument (referred to herein as a standalone instrument) to at least another integrated labware process machine or standalone instrument (the integrated labware process machine(s) and the standalone instrument(s) being generically represented in FIG. 1 as labware processing units 111-116, 121-126, 131-136) within a single lab 110, 120, 130 and/or communicably connects one or more different labs 110, 120, 130 to each other. Referring also to FIG. 2, the labware bulk overhead transport system module 150M is configured to communicably connect benchtop or standalone instruments 200, 201, 203, 204 within a lab 110, 120, 130 with other integrated systems, such as integrated labware process machines/appliance 210-213 (which include but are not limited to islands of automation).

As will be described herein, each labware bulk overhead transport system module 150M includes a substantially continuous labware support 330. The substantially continuous labware support 330 is illustrated in the FIGS. as being coupled to and supported by a ceiling 477 of the laboratory facility 100; however, in other aspects the substantially continuous labware support 330 may be supported on a floor 444 of the laboratory facility 100 in any suitable manner, such as by stanchions. The substantially continuous labware support 330 has at least a movable part 151 that supports labware thereon for transport along the substantially continuous labware support 330 within a laboratory (also referred to herein as a lab) 110, 12, 130 or between labs 110, 120, 130. The modular labware transport system 150 includes a controller 199 that is configured to locate the movable part 151 along the substantially continuous labware support 330 for transferring labware 170 between the modular labware transport system 150 and the at least one integrated labware process machine 210-213 and/or the standalone instrument 200, 201, 203, 204.

The aspects of the present disclosure effect transport of labware 170 within or between labs 110, 120, 130 disposed at one or more of a common level (e.g., on the same floor of the laboratory facility 100) and within or between labs 110, 120, 130 located on different levels (e.g., different stacked levels/floors of the laboratory facility 100). For example the labware bulk overhead transport system module 150M includes a lift or lifting conveyor module 185 (also referred to herein as labware bulk transport system module 185 and includes e.g., an elevator 185E, ramps 185R, and/or other suitable structure that effects an elevational change of labware supported by a movable part 151 of a labware support 330 of the labware bulk overhead transport system module 150M-see FIG. 3A) configured to transport labware 170 from one laboratory level 100L1 (e.g., a floor) to another laboratory level 100L2 (e.g., above or below the one laboratory level 100L1). Here, the movable part 151 may transition along the labware bulk overhead transport system module 150M to the different stacked laboratory levels (e.g., via the lift 185); while in other aspects, the lift 185 may be configured to pick the labware from the movable part 151 at one laboratory level 100L1, 100L2 and place the labware to a movable part 151 of another labware bulk overhead transport system module 150M at a different laboratory level 100L1, 100L2.

Still referring to FIGS. 1-3, the labware bulk overhead transport system module 150M forms a labware bulk overhead transport path 166 connecting, within the laboratory facility 100, at least one integrated labware process machine 210-213 or a standalone instrument 200, 201, 203, 204 to at least another different integrated labware process machine 210-213 or standalone instrument 200, 201, 203, 204 (within the same laboratory 110, 120, 130 or different laboratories 110, 120, 130). Here the at least one integrated labware process machine 210-213 or standalone instrument 200, 201, 203, 204 and the at least another different integrated labware process machine 210-213 or standalone instrument 200, 201, 203, 204 are separated from each other by any suitable distance along the labware bulk overhead transport path 166. As noted above, any one (or more) of the integrated labware process machine(s) 210-213 and the standalone instrument(s) 200, 201, 203, 204 are generically represented in FIG. 1 as labware processing units 111-116, 121-126, 131-136 and may be located at any one of the positions illustrated in FIG. 1 with respect to the labware processing units 111-116, 121-126, 131-136.

Figure 4:
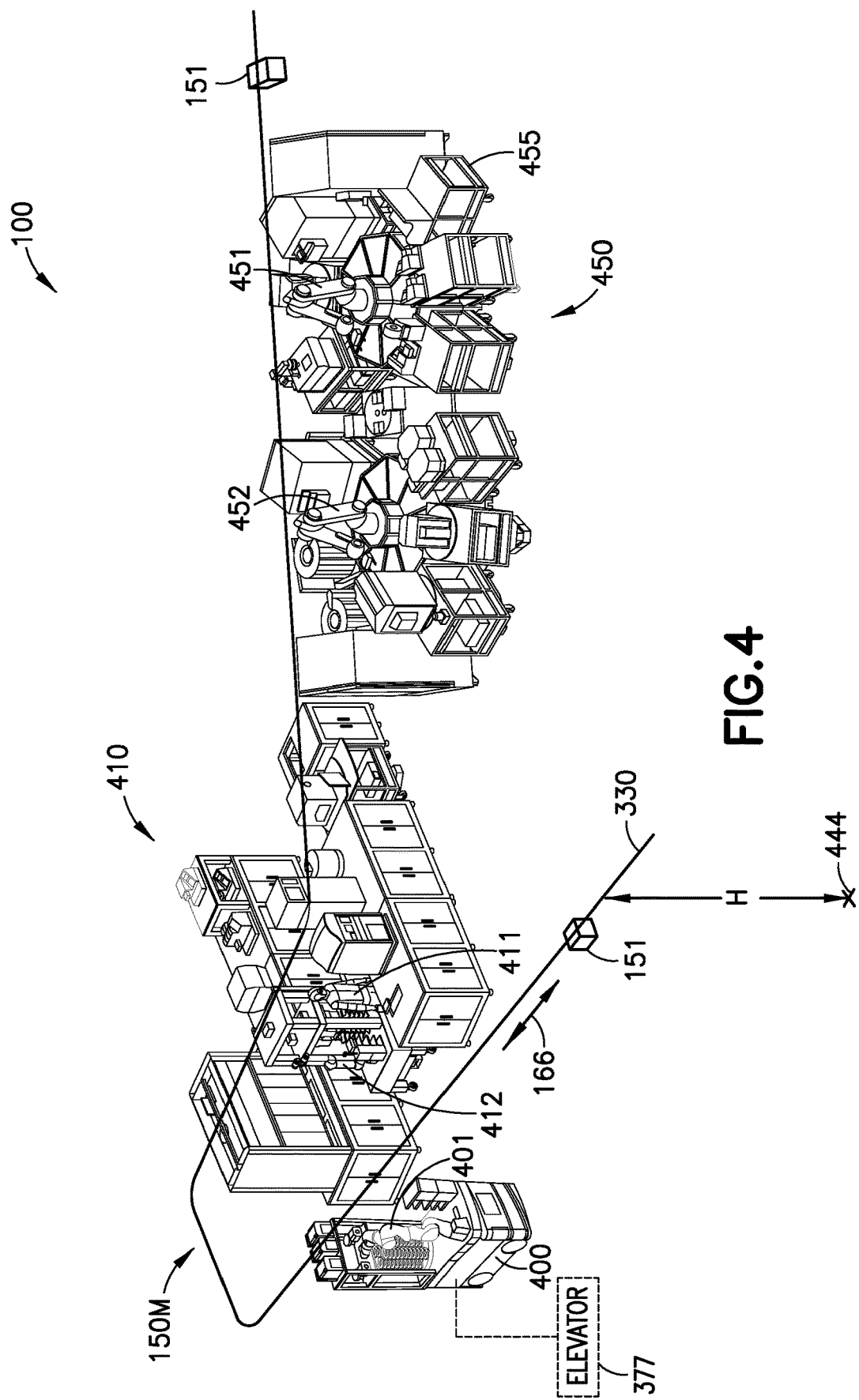
FIG. 4 is a perspective illustration of a portion of the laboratory facility of FIG. 1 in accordance with aspects of the disclosed embodiment.

It is noted that the standalone instruments 200, 201, 203, 204 may be any suitable standalone or benchtop instruments such as those illustrated in FIG. 4. For example, the benchtop instruments 200, 201, 203, 204 (FIG. 2) may include any suitable benchtop laboratory processing station 410 in which a human 411 and/or automation (e.g., robot arm 412) operate to process laboratory samples (either independently or in a collaborative manner) and/or auto-navigating robotic processing vehicles 400. Here the benchtop laboratory processing station 410 is disposed underneath the labware bulk overhead transport path 166 so that the robot arm 412 and/or human 411 is disposed to pick/place labware 170 from the movable part 151 as described herein. The auto-navigating robotic processing vehicles 400 may navigate to predetermined locations of the laboratory facility 100 so that the auto-navigating robotic processing vehicles 400 is disposed underneath the labware bulk overhead transport path 166 so that a robot arm 412 of the auto-navigating robotic processing vehicles 400 is disposed to pick/place labware 170 from the movable part 151 as described herein. Suitable examples of the benchtop laboratory processing stations 410 and auto-navigating robotic processing vehicles 400 can be found in U.S. Pat. No. 10,955,430 (issued on Mar. 23, 2021 and titled "auto-navigating Robotic Processing Vehicle) and United States publication number 2021/0094184 (published on Apr. 1, 2021, having application Ser. No. 17/032,011 and titled "Robotic Transport System and Method Therefor") the disclosures of which are incorporated herein by reference in their entireties.

It is also noted that the integrated labware process machines 210-213 may be any suitable process machines such as islands of automation 450 that include at least one robot arm 451, 452 and any suitable number of labware process machines 455. The islands of automation 450 are disposed underneath the labware bulk overhead transport path 166 so that the robot arm(s) 451, 452 of the islands of automation 450 is/are disposed to pick/place labware 170 from the movable part 151 as described herein. Suitable examples of the islands of automation 450 can be found in U.S. Pat. No. 10,955,430 (issued on Mar. 23, 2021 and titled "auto-navigating Robotic Processing Vehicle) and United States publication numbers 2021/0094184 (published on Apr. 1, 2021, having application Ser. No. 17/032,011 and titled "Robotic Transport System and Method Therefor") and 2019/0241375 (published on Aug. 8, 2019, having application Ser. No. 16/265,273 and titled "Robotic Processing System") the disclosures of which are incorporated herein by reference in their entireties.

The labware bulk overhead transport system module 150M has a substantially continuous labware support 330 that extends longitudinally along the labware bulk overhead transport path 166. The substantially continuous labware support 330 has a least one nest or movable part 151 that is movable, relative to the laboratory facility 100 longitudinally so as to define the labware bulk overhead transport path 166 of the labware 170 supported on the labware bulk overhead transport system module 150M. As illustrated in FIGS. 1-4, the substantially continuous labware support 330 is configured to position the movable part 151 relative to the standalone instruments 200, 201, 203, 204 and the integrated labware process machines 210-213 so that the movable parts 151 pass overhead of the standalone instruments 200, 201, 203, 204 and the integrated labware process machines 210-213 while being low enough relative to a floor 444 (see FIG. 4) of the laboratory facility 100 so that the humans 411 and robot arms of the standalone instruments 200, 201, 203, 204 and the integrated labware process machines 210-213 have access to the movable parts 151 for transferring labware to and from the movable parts 151.

The spacing or height H of the substantially continuous labware support 330 from the floor of the laboratory facility 100 is such that the humans 411, auto-navigating robotic processing vehicles 400, and other suitable laboratory facility carts (such as those described in U.S. Pat. No. 10,955,430 (issued on Mar. 23, 2021 and titled "auto-navigating Robotic Processing Vehicle), previously incorporated herein by reference in its entirety) pass underneath (see FIG. 2) the substantially continuous labware support 330 (and movable parts 151 thereof) free from obstruction by the substantially continuous labware support 330. Placement of the substantially continuous labware support 330 at the height H provides for laboratory resources, carts, robots, etc. to have access to the labware 170 transported by the substantially continuous labware support 330 throughout the laboratory facility 100 while providing for reconfiguration of the laboratory equipment as well as optimized maintenance access and transport travel paths for humans, carts, etc. throughout the laboratory facility 100.

In other aspects, the movable parts 151 may have a Z-axis drive 333 (FIG. 3A) that raises and lowers respective labware holding stations 311-313 of the movable parts 151 to effect human or robot arm access to the labware carried by the movable parts 151. The Z-axis drive 333 provides for placement of the substantially continuous labware support 330 at any suitable height above the floor 444 while still providing for laboratory resources, carts, robots, etc. to have access to the labware 170 transported by the substantially continuous labware support 330 throughout the laboratory facility 100 while providing optimized and maintenance access and transport travel paths for humans, carts, etc. throughout the laboratory facility 100 in the manner described above. In one or more aspects, where the movable parts 151 include the Z-axis drive 333, the movable parts include any suitable power and communications modules 333P, 333C for powering the Z-axis drive and receiving commands from the controller 199. The power module 333P may be any suitable battery (e.g., that may be charged at designated areas of the substantially continuous labware support 330, such as at interface locations or dedicated charging pad locations CL—see FIG. 1—via power contact pads similar to those described herein), wireless power coupling (e.g., that receives power from a remote power source located in the laboratory facility 100), or contact power coupling (e.g., that derives power from a bus bar of the substantially continuous labware support 330). In other aspects, the Z-axis drive may be coupled to power and the controller 199 in any suitable manner at interface locations (such as those illustrated in the FIGS.) for transfer of labware 170 between the movable parts 151 and the standalone instruments 200, 201, 203, 204 and the integrated labware process machines 210-213. For example, stopping traverse of the movable part 151 on the substantially continuous labware support 330 at the interface location may substantially automatically couple power and communications with the movable part 151 (such as through contact between power/communication contact pad(s) CP of the substantially continuous labware support 330 and power/communication contact pad(s) CM of the movable part 151). While the aspects of the disclosed embodiment are described herein as being overhead, in other aspects the substantially continuous labware support 330 may be disposed underneath the laboratories (e.g., under the floor 444) where the Z-axis drive is employed to lift the movable part 151 above the floor for laboratory access to the labware.

Figure 3A:
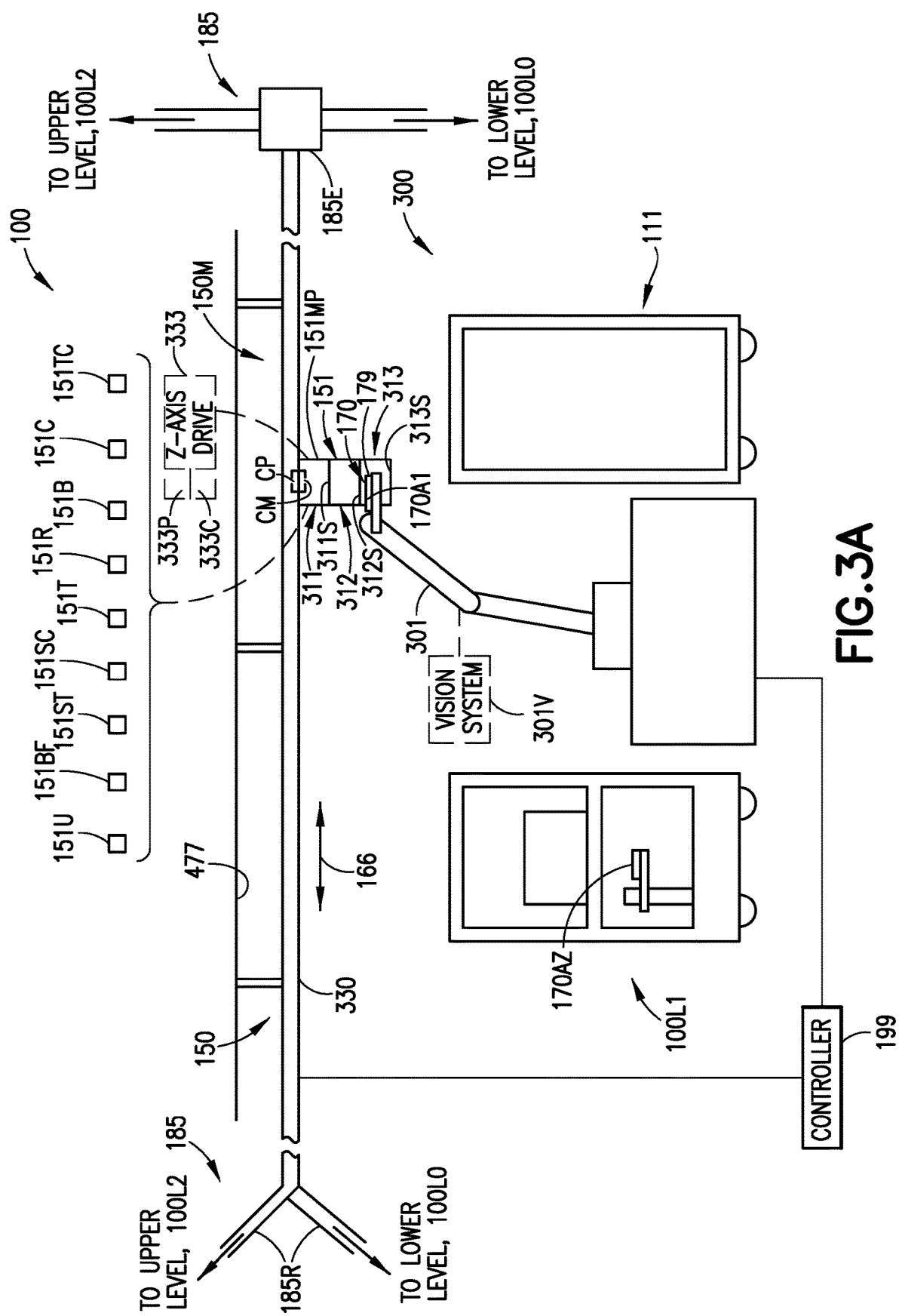
FIG. 3A is a schematic elevation view of a portion of the lab illustrated in FIG. 2 in accordance with aspects of the disclosed embodiment.

The at least one movable part 151 is disposed so as to support labware 170 thereon. For exemplary purposes, the at least one movable part 151 is illustrated in FIG. 3A as being configured to support more than one labware 170, where each labware is supported on a respective labware shelf/support 311S-313S of a respective labware holding station 311-313; however, in other aspects the movable part 151 may be configured to support but a single labware 170. In one aspect, movable part 151 is configured to support the labware 170 in deterministic locations on the movable part 151 so that a location of the labware is known to automation (e.g., robots such as robot 301) of the laboratory facility 100 for picking and placing the labware from and to the movable part 151. In other aspects, the automation may include at least one vision system 301V configured to determine a location of the labware 170 on the movable part 151 to effect picking and placing of the labware 170 from and to the movable part 151.

Movement of the movable part 151 along the substantially continuous labware support 330 is effected in any suitable manner. For example, the substantially continuous labware support 330 a solid state actuator that includes a magnetic drive that interacts with and magnetically drives (e.g., in a single transport direction or bi-direction transport direction) the movable part 151 along the substantially continuous labware support 330 and along the labware bulk overhead transport path 166 defined thereby. In other aspects, the substantially continuous labware support 330 includes any suitable mechanical, electromechanical, and/or magnetic linear actuator/conveyance (e.g., solid state conveyor) for driving the at least one movable part 151 along the labware bulk overhead transport path 166.

The labware 170 supported by the at least one movable part 151 and processed within the laboratory facility 100 is any suitable labware including, but not limited to, sample bag frames 171, sample tubes 172, sample cassettes 173, trays 174, racks 175, boxes, 176, containers 177, tissue cassettes 178, and multi-well plates 179. In one or more aspects, to accommodate the different types of labware 170, the at least one movable part 151 includes more than one dedicated movable parts 151BF (e.g., for holding sample bag frames), 151ST (e.g., for holding at least one sample tube), 151SC (e.g., for holding at least one sample cassette), 151T (e.g., for holding at least one tray), 151R (e.g., for holding at least one rack), 151B (for holding at least one box), 151C (e.g., for holding at least one container), 151TC (e.g., for holding at least one tissue cassette), 151MP (e.g., for holding at least one multi-well plate) each having a different configuration for holding a respective type of labware 170. In one or more aspects, the at least one movable part 151 may be configured as a universal movable part 151U configured to interchangeably hold more than one type of labware 170. In still one or more other aspects, the at least one movable part 151 includes a combination of universal and dedicated movable parts 151U, 151BF, 151ST, 151SC, 151T, 151R, 151B, 151C, 151TC, 151MP.

Referring to FIG. 3A, the substantially continuous labware support 330 has more than one predetermined labware holding stations 311-313 disposed to hold a labware piece (e.g., a labware piece being an instance of the labware 170 described herein-see FIG. 3A) of the labware 170 supported on the substantially continuous labware support 330. Each of the predetermined labware holding stations 311-313 has a different predetermined location along the substantially continuous labware support 330 and labware bulk overhead transport path 166. Here, each of the predetermined labware holding stations 311-313 of the substantially continuous labware support 330 includes the at least one movable part 151 so that the predetermined labware holding station, and the predetermined location, moves along the labware bulk overhead transport path 166.

Referring to FIGS. 1-4, as noted above, the controller 199 is communicably coupled to the labware bulk overhead transport system module 150M. The controller 199 is configured so as to locate each labware holding station 311-313 (of the at least one movable part 151), moving along the labware bulk overhead transport path 166, with respect to one or more of the at least one integrated labware process machine 210-213 and the at least one standalone instrument 200, 201, 203, 204 to effect transfer of labware between the movable part 151 and the one or more of the at least one integrated labware process machine 210-213 and the at least one standalone instrument 200, 201, 203, 204. Transfer of the labware between the movable part and the one or more of the at least one integrated labware process machine 210-213 and the at least one standalone instrument 200, 201, 203, 204 can be effected by a robot (or bot) arm reaching into the movable part 151 to pick/place labware 170 at a level of the transport path 166 of the substantially continuous labware support 330, the robot arm reaching into the movable part 151 at an elevation below the transport path 166 (e.g., such as where the movable part 151 is lowered by Z-axis drive 333), and/or by intermediary transfer of labware 170 between the movable part 151 (at a level of the transport path 166) and the robot arm disposed below the transport path 166.

For example, with brief reference to FIG. 3A, the controller 199 is configured to command a robot (or bot) arm, such as one of arms 280-286, 301, 401, 412, 451, 452, associated with the one or more of the at least one integrated labware process machine 210-213 and the at least one standalone instrument 200, 201, 203, 204 to effect load and unload of the labware 170 onto and off of the labware support 311S-313S (see also FIG. 2) of a predetermined labware holding station 311-313, with the predetermined labware holding station 311-313 positioned within a range of motion of the robot arm 280-286, 301, 401, 412, 451, 452. Here the range of motion of the robot arm 280-286, 301, 401, 412, 451, 452 extends to the transport path 166 for transfer of labware 170 to and from the movable part 151 at a level of the transport path 166. Here the predetermined labware holding station 311-313 is located adjacent to (i.e., is juxtaposed to) the one or more of the at least one integrated labware process machine 210-213 and the at least one standalone instrument 200, 201, 203, 204 at load and unload of the labware 170 from the predetermined labware holding station 311-313.

As another example, with brief reference to FIG. 3A, where the range of motion of the robot arm 280-286, 301, 401, 412, 451, 452 does not extend to the level of the transport path, the Z-axis drive 333 is employed and commanded by the controller 199 to lower the movable part 151 to within the range of motion of the robot arm 280-286, 301, 401, 412, 451, 452. Here, with the movable part 151 lowered to within the range of motion of the robot arm 280-286, 301, 401, 412, 451, 452, labware 170 is/are picked/placed by the robot arm 280-286, 301, 401, 412, 451, 452 from/to the movable part 151.

Figure 3B:
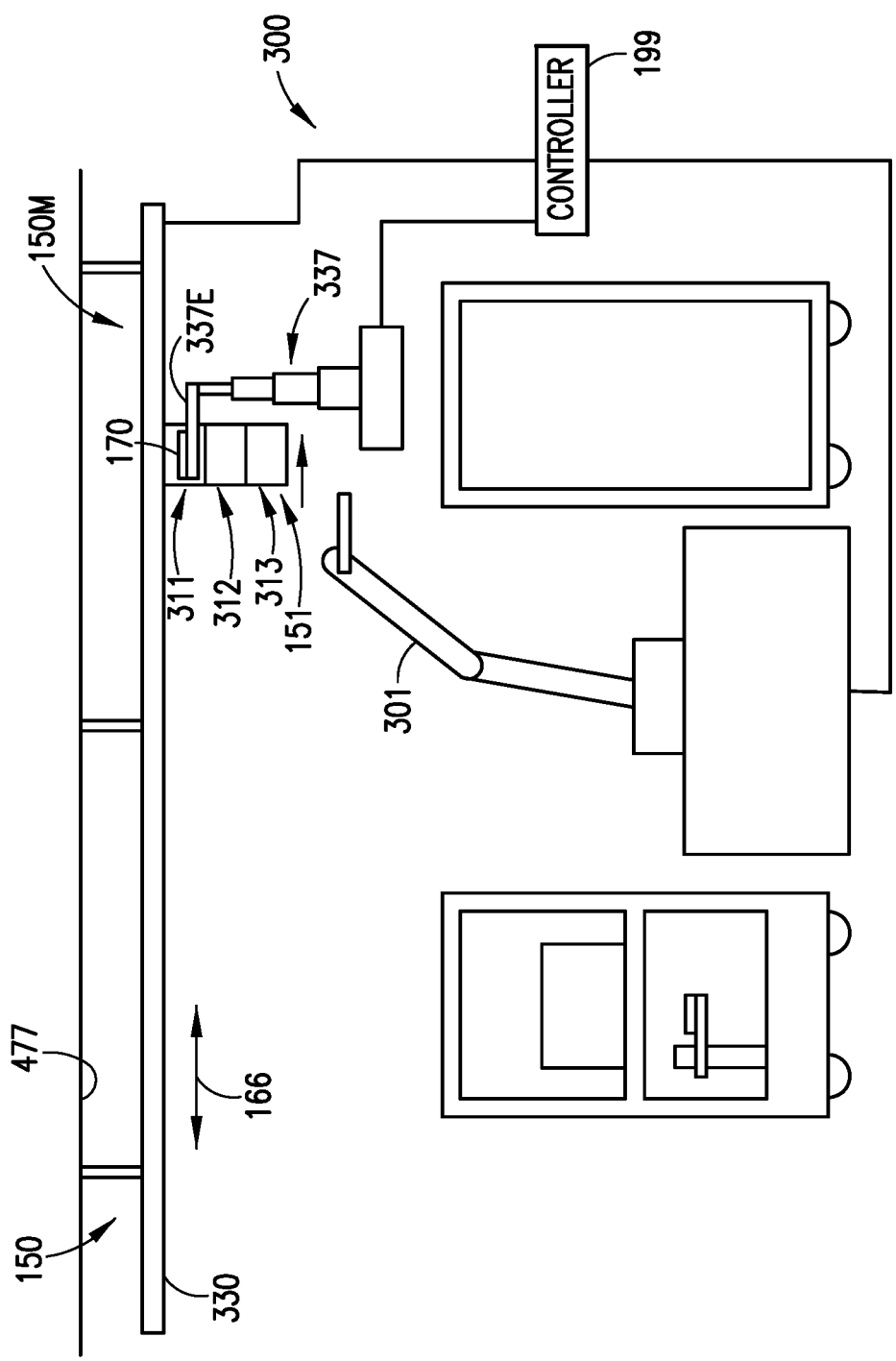
Figure 3D:
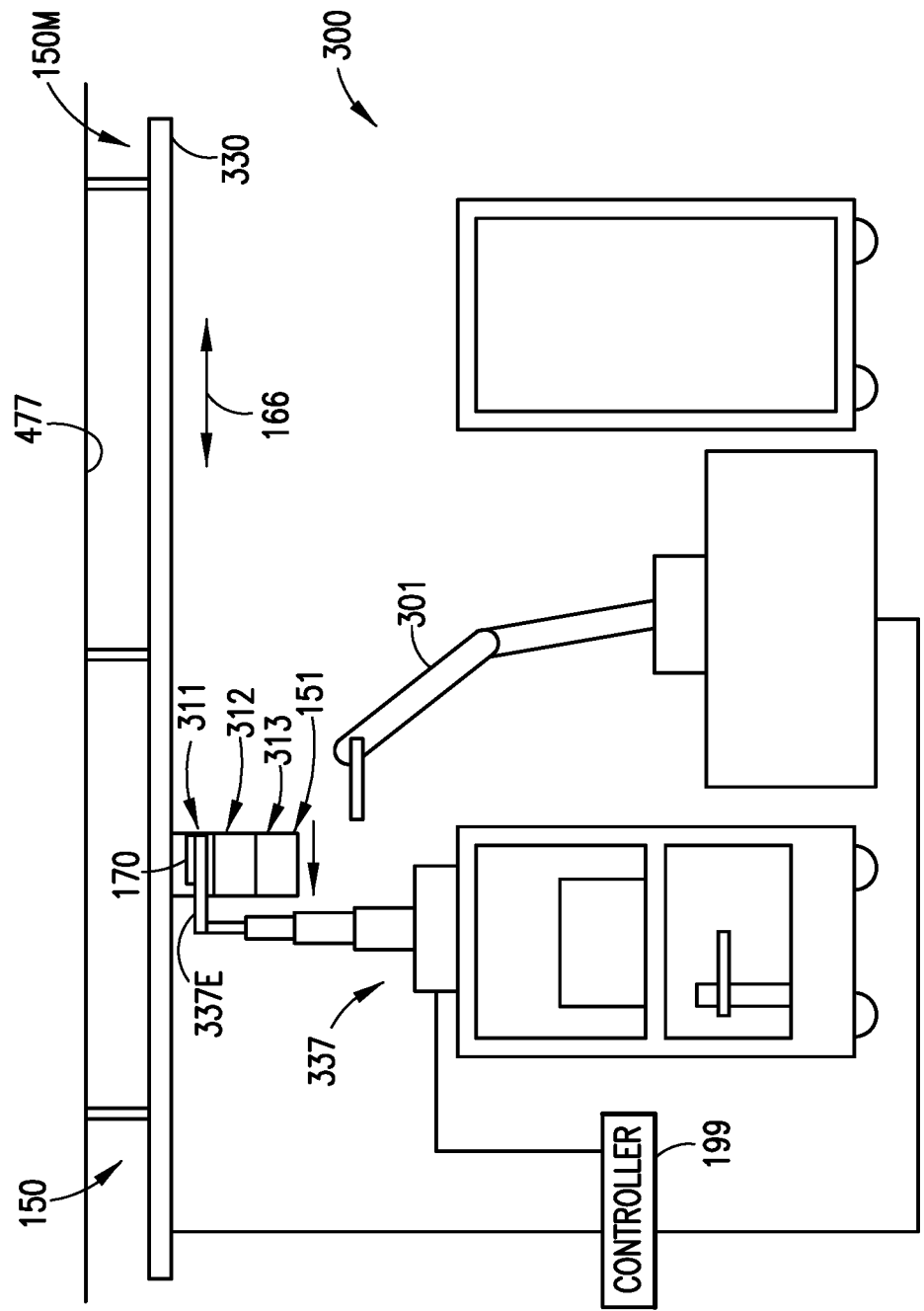
Figure 3E:
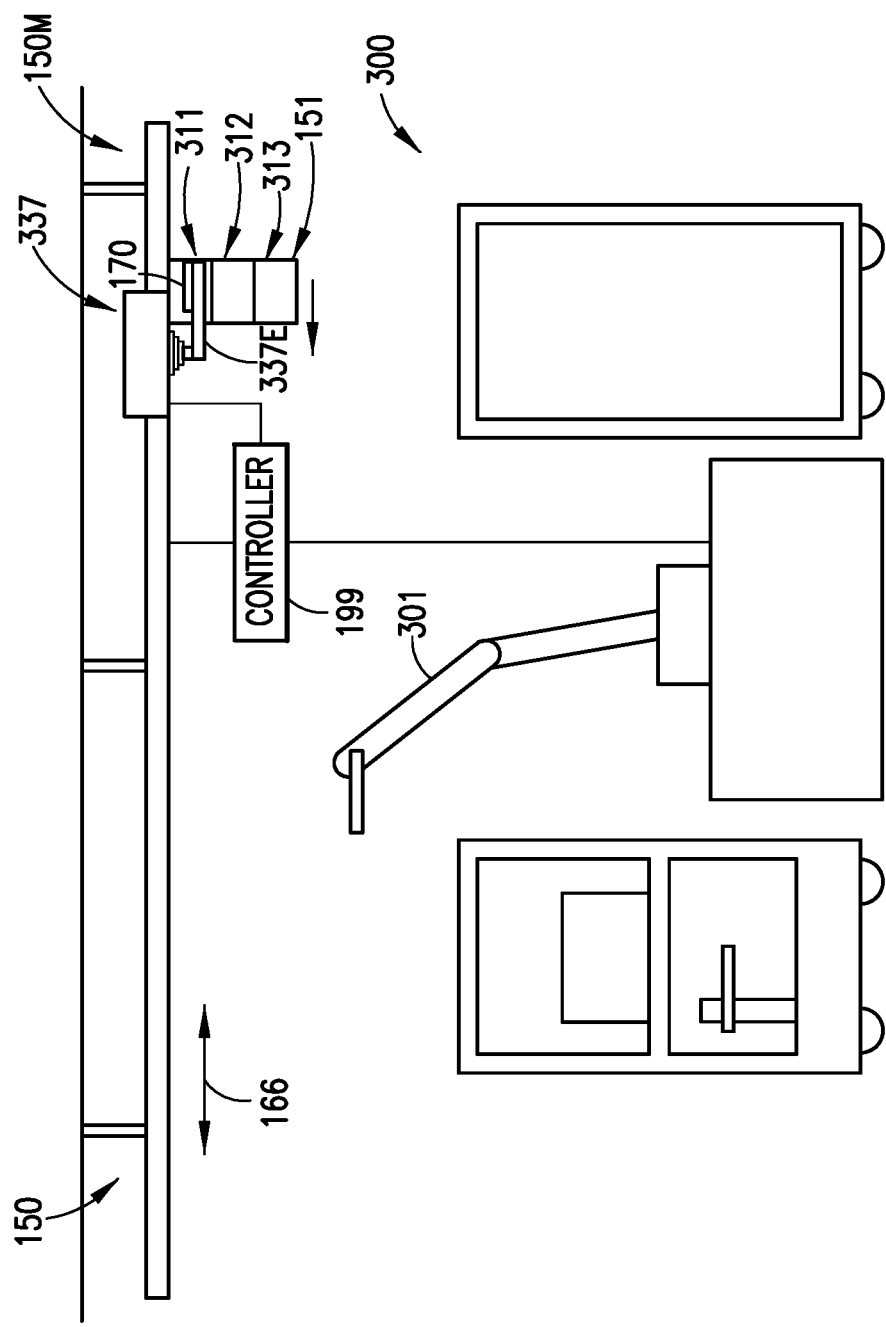

As a further example, with brief reference to FIGS. 3B, 3C, 3D, 3E, and 3F, an intermediary (such as elevator 337) transfers labware 170 between the movable part 151 (e.g., disposed at a level of the transport path 166) and the robot arm 280-286, 301, 401, 412, 451, 452, with the movable part 151 being outside the range of the robot arm 280-286, 301, 401, 412, 451, 452. Here, as illustrated in FIGS. 3B and 3C, the elevator 337 is disposed at a fixed location (e.g., vertically and horizontally fixed so as to have a known location relative to both the labware bulk overhead transport system module 150M, 150MA, 150MB, 150MC, 150MD and components of an integrated labware process machine 210-213 or standalone instrument 200, 201, 203, 204 to which the elevator 337 serves. The elevator 337 may be mounted at a fixed location on a wall of the laboratory facility 100 and/or other suitable fixed structure of the laboratory facility 100. The other suitable fixed structure, to which the elevator 337 may be fixed, coupled, or otherwise mounted to/dependent from (e.g., supported by), include but are not limited to the ceiling 477 of the laboratory facility 100, the floor of the laboratory facility 100, the substantially continuous labware support 330, or other part forming the labware bulk overhead transport system module 150M, 150MA, 150MB, 150MC, 150MD (as illustrated in FIG. 3E), and a workstation (such as standalone instrument 204 in FIG. 2). In this aspect, the elevator 337 provides, with the labware bulk overhead transport system module 150M, 150MA, 150MB, 150MC, 150MD, registration of the of the elevator 337 in a controller designated/corresponding to laboratory processing units 111-116, 121-126, 131-136 in proximity.

Figure 3F:
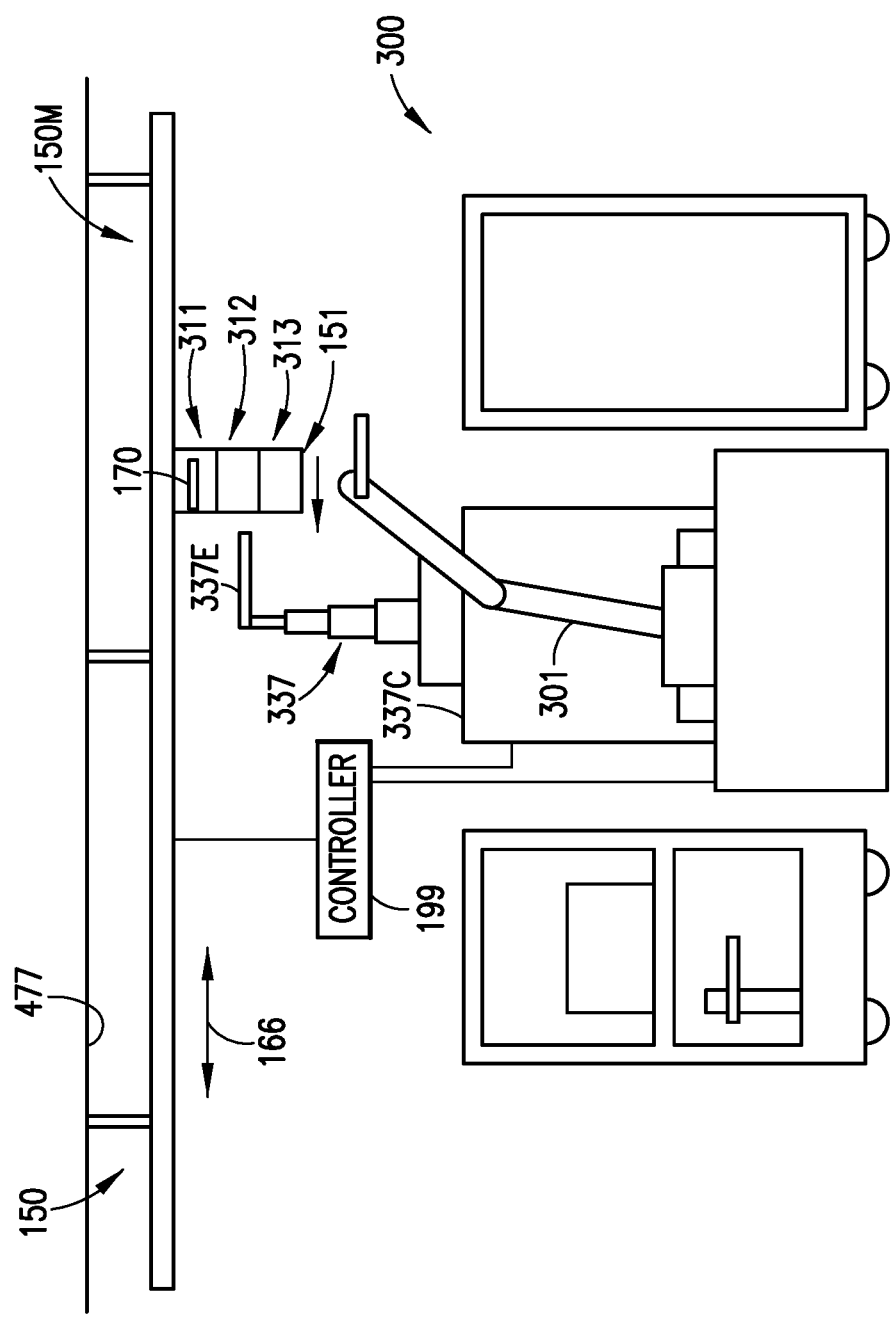

The elevator 337 may also be movably mounted within the laboratory facility 100 so as to be positioned and repositioned at known locations to effect transfer/handoff of the labware 170 between the movable part 151 and the robot arm 280-286, 301, 401, 412, 451, 452. For example, the elevator 337 is mounted to an auto-navigating cart/vehicle (such as auto-navigating robotic processing vehicles 400 illustrated in FIGS. 2 and 4) where the auto-navigating cart/vehicle is commanded to move (e.g., opportunistically and/or at predetermined times) to a predetermined location to handoff the labware 170 between the movable part 151 and the robot arm 280-286, 301, 401, 412, 451, 452. The elevator 337 may also be mounted to or integral with a dedicated elevator cart 337C as shown in FIG. 3F and/or disposed on a workstation cart as illustrated in FIG. 3D, where the elevator cart 337C and/or workstation cart is/are pre-positioned (e.g., manually or with any suitable robotic automation) so as to present a persistent static elevator location known to the controller 199 (or determinable by the controller 199 with, for example, vision system 301V, radio frequency tags or other suitable automated location determination devices). In other aspects, the elevator cart 337C and/or workstation cart is/are dynamically positioned (e.g., manually or with any suitable robotic automation) to predetermined locations (e.g., known to the controller 199 or determinable by the controller 199 with, for example, vision system 301V, radio frequency tags or other suitable automated location determination devices) to effect handoff the labware 170 between the movable part 151 and the robot arm 280-286, 301, 401, 412, 451, 452. Again, provision of the elevator 337 may be initialized, registered in a controller associated with predetermined locations or range of locations, and designated to corresponding laboratory processing units 111-116, 121-126, 131-136 in proximity.

The range of motion of the elevator 337 extends to both the level of the transport path (e.g., so as to provide access to each labware holding stations 311-313 of the movable parts 151) and within the range of the robot arm 280-286, 301, 401, 412, 451, 452. The elevator 337 is any suitable elevator configured to move end effector 337E vertically to transfer labware between the labware holding stations 311-313 and robot arm 280-286, 301, 401, 412, 451, 452. For example, the end effector 337E may be raised and lowered by a telescoping piston, a linear actuator, along rails that span the transport path, or any other suitable elevating mechanism that places the end effector within the transport path 166 and removes the end effector from the transport path 166 (e.g., to allow passage of the movable parts above the elevator 337 without obstruction from the end effector 337E.

In operation, the controller 199 commands the elevator to raise the end effector to a predetermined height corresponding with a predetermined labware holding station 311-313 of a predetermined movable part 151. The controller 199 commands traverse of the movable part 151 along the transport path 166 in a first direction so that traverse of the movable part 151 along the transport path 166 in the first direction inserts the end effector 337E into the predetermined holding station 311-313. The controller 199 command vertical movement of the end effector 337E to pick labware 170 from the predetermined labware holding station 311-313. The movable part 151 is commanded to traverse along the transport path 166 in a second direction (e.g., opposite the first direction) so that traverse of the movable part 151 along the transport path 166 in the second direction removes the end effector 337E (with the labware 170 held thereon) from the predetermined holding station 311-313. The elevator 337 is commanded by the controller 199 to lower the end effector 337E to a known/predetermined location within the range of motion of the robot arm 280-286, 301, 401, 412, 451, 452 so that the robot arm picks the labware 170 from the end effector 337E of the elevator 337. Transfer of labware from the robot arm 280-286, 301, 401, 412, 451, 452 to the movable part 151 may occur in a substantially opposite manner to that described above.

The controller 199 includes any suitable memory 199M that is integral to or accessible by the controller 199. The controller is configured to register (e.g., in the memory 199M) an identity of the labware 170 loaded or unloaded by the robot arm 280-286, 301, 401, 412, 451, 452 to or from the predetermined labware holding station 311-313. Here the controller may be configured to track the locations of the labware 170 within the laboratory facility 100 and command movement of the labware 170, e.g., with the robot arms 280-286, 301, 401, 412, 451, 452 and modular labware transport system 150, for processing within the laboratory facility 100 according to any suitable processing criteria. With the identity of the labware 170 in registry (i.e., in memory 199M), the controller 199 is configured to (i.e., effect) swapping of labware 170 at the predetermined labware holding station 311-313. For example, referring to FIG. 3A, the controller 199 may command robot arm 301 to swap labware 170 in predetermined labware holding station 313 from labware 170A1 with a first identity in the registry (i.e., where the labware 170A1 is unloaded from the predetermined labware holding station 313) to different labware 170A2 with a second identity in the registry (i.e., where labware 170A2 is loaded to the predetermined labware holding station 313) with the movable part 151. The swapping of the labware 170A1 with the different labware 170A2 is illustrated as being made at a common processing unit 111 with the movable part 151 remaining stationary for the swap; however, in other aspects, the labware 170A1 may be unloaded from predetermined labware holding station 313 at one processing unit 111-116, 121-126, 131-136 and the different labware 170A2 may be loaded into the predetermined labware holding station 313 at a different processing unit 111-116, 121-126, 131-136.

Referring to FIGS. 1, 2, and 4, the controller 199 is configured to move (e.g., via commanding at least movement of the movable part 151) the labware 170, loaded in the predetermined labware holding station 311-313 (of the movable part 151), along the labware bulk overhead transport path 166 from at least one integrated labware process machine 210-213 or standalone instrument 200, 201, 203, 204 to the at least another different integrated labware process machine 210-213 or standalone instrument 200, 201, 203, 204, separated from each other by any suitable distance along the labware bulk overhead transport path 166, where the at least another different integrated labware process machine 210-213 or standalone instrument 200, 201, 203, 204 is located on a common level (e.g., floor) of the laboratory facility 100 with the at least one integrated labware process machine 210-213 or standalone instrument 200, 201, 203, 204. Referring also to FIG. 3A, the controller 199 is configured to move (e.g., via commanding at least movement of the movable part 151) the labware 170, loaded in the predetermined labware holding station 311-313 (of the movable part 151), along the labware bulk overhead transport path 166 from at least one integrated labware process machine 210-213 or standalone instrument 200, 201, 203, 204 to the at least another different integrated labware process machine 210-213 or standalone instrument 200, 201, 203, 204, separated from each other by any suitable distance along the labware bulk overhead transport path 166, where the at least another different integrated labware process machine 210-213 or standalone instrument 200, 201, 203, 204 is located on a different level (e.g., floor) of the laboratory facility 100 than the at least one integrated labware process machine 210-213 or standalone instrument 200, 201, 203, 204. As can be seen in FIG. 3A, the transport path 166 extends along the lift module 185 to an upper level (e.g., floor) 100L2 and/or a lower level (e.g., floor) 100L0 of the laboratory facility 100. The upper level 100L2 and/or lower level 100L0 are configured with at least one integrated labware process machine 210-213 or standalone instrument 200, 201, 203, 204 and labware bulk overhead transport system modules 150M in a manner similar to that described herein for level 100L1 (see also FIG. 1).

Referring to FIGS. 1 and 2, the labware bulk overhead transport system module 150M (FIG. 2) is a modular transport system that is configured to be expanded or reduced in size/capacity depending on for example a desired number of labs 110, 120, 130 and/or labware processing units 111-116, 121-126, 131-136 to be communicably coupled to each other with the modular labware transport system 150. For example, the modular labware transport system 150 includes more than one labware bulk transport system module 150M, 150MA, 150MB, 150MC, 150MD, 185. Each labware bulk transport system module 150M, 150MA, 150MB, 150MC, 150MD, 185 is modularly arranged to as to be communicably coupled to another different labware bulk overhead transport system module 150M, 150MA, 150MB, 150MC, 150MD, 185 of the modular labware transport system 150. In one or more aspects, the other different labware bulk overhead transport system module 150M, 150MA, 150MB, 150MC, 150MD is another labware bulk overhead transport system module 150M, 150MA, 150MB, 150MC, 150MD disposed on a common level (e.g., one of levels 100L0, 100L1, 100L2) with the labware bulk transport system module 150M, 150MA, 150MB, 150MC, 150MD; or the other labware bulk overhead transport system module 185 is the lift or lifting conveyor module 185 that is arranged so as to couple the labware bulk transport system module 150M, 150MA, 150MB, 150MC, 150MD at one level 100L0, 100L1, 100L2 to another different labware bulk transport system module 150M, 150MA, 150MB, 150MC, 150MD at another different level 100L0, 100L1, 100L2 that is above or below the one level 100L0, 100L1, 100L2. In one or more aspects, the other different labware bulk overhead transport system module 150M, 150MA, 150MB, 150MC, 150MD includes another labware bulk overhead transport system module 150M, 150MA, 150MB, 150MC, 150MD, joined to the labware bulk overhead transport system module 150M, 150MA, 150MB, 150MC, 150MD at one location of a common level (e.g., one of levels 100L0, 100L1, 100L2), and includes at least one lift or lifting conveyor module 185 joined to at least one of the labware bulk overhead transport system module 150M, 150MA, 150MB, 150MC, 150MD or the other labware bulk overhead transport system module 150M, 150MA, 150MB, 150MC, 150MD.

Each labware bulk transport system module 150M, 150MA, 150MB, 150MC, 150MD forms a respective labware bulk overhead transport path 166, 166MA, 166 MB, 166MC, 166MD that is different and/separate from another labware bulk overhead transport path 166, 166MA, 166 MB, 166MC, 166MD formed by each other of the labware bulk transport system module 150M, 150MA, 150MB, 150MC, 150MD. Each of the each labware bulk transport system module 150M, 150MA, 150MB, 150MC, 150MD effects undisrupted (e.g., substantially continuous, substantially constant, or steady state) transport of the labware 170 throughout the respective labware bulk overhead transport path 166, 166MA, 166 MB, 166MC, 166MD with the labware bulk transport system module 150M, 150MA, 150MB, 150MC, 150MD both coupled to and uncoupled from the other labware bulk transport system module(s) 150M, 150MA, 150MB, 150MC, 150MD. For example, with the labware bulk transport system module 150M, 150MA, 150MB, 150MC, 150MD coupled to the other labware bulk transport system module(s) 150M, 150MA, 150MB, 150MC, 150MD transfer of the labware 170 between the different labware bulk transport system modules 150M, 150MA, 150MB, 150MC, 150MD and to/from the different labware processing units 111-116, 121-126, 131-136 is configured to maintain the undisrupted transport of the labware 170 throughout the respective labware bulk overhead transport paths 166, 166MA, 166 MB, 166MC, 166MD. With the labware bulk transport system module 150M, 150MA, 150MB, 150MC, 150MD uncoupled from the other labware bulk transport system module(s) 150M, 150MA, 150MB, 150MC, 150MD (e.g., transfer between labware bulk transport system module 150M, 150MA, 150MB, 150MC, 150MD is not performed) transfer of the labware 170 to/from the different labware processing units 111-116, 121-126, 131-136 is configured to maintain the undisrupted transport of the labware 170 throughout the respective labware bulk overhead transport paths 166, 166MA, 166 MB, 166MC, 166MD.

Referring to FIGS. 1 and 5A-5C, each coupling 500 between the labware bulk transport system module 150M, 150MA, 150MB, 150MC, 150MD and the other labware bulk transport system module(s) 150M, 150MA, 150MB, 150MC, 150MD defines a labware transfer junction 500J. The labware transfer junction 500J is configured to effect transfer of the labware 170 between the labware bulk transport system module 150M, 150MA, 150MB, 150MC, 150MD and the other labware bulk transport system module(s) 150M, 150MA, 150MB, 150MC, 150MD. The labware transfer junction 500J, defined by the coupling 500, defines a switch 500S for labware 170 switching from one labware bulk overhead transport path 166, 166MA, 166 MB, 166MC, 166MD to another different labware bulk overhead transport path 166, 166MA, 166 MB, 166MC, 166MD.

Figure 5A:
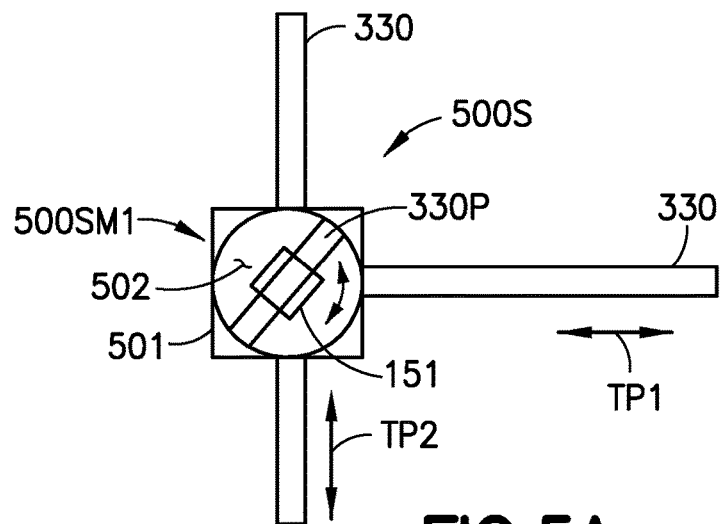
FIGS. 5A-5D are exemplary schematic plan illustrations of portions of the laboratory facility of FIG. 1 in accordance with aspects of the disclosed embodiment.
Figure 5B:
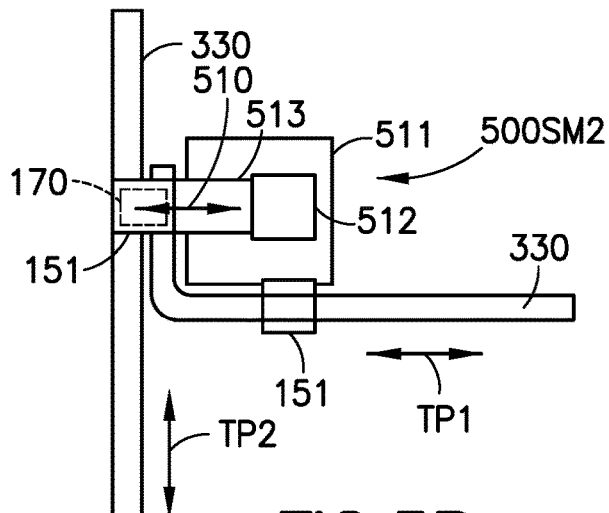
Figure 5C:
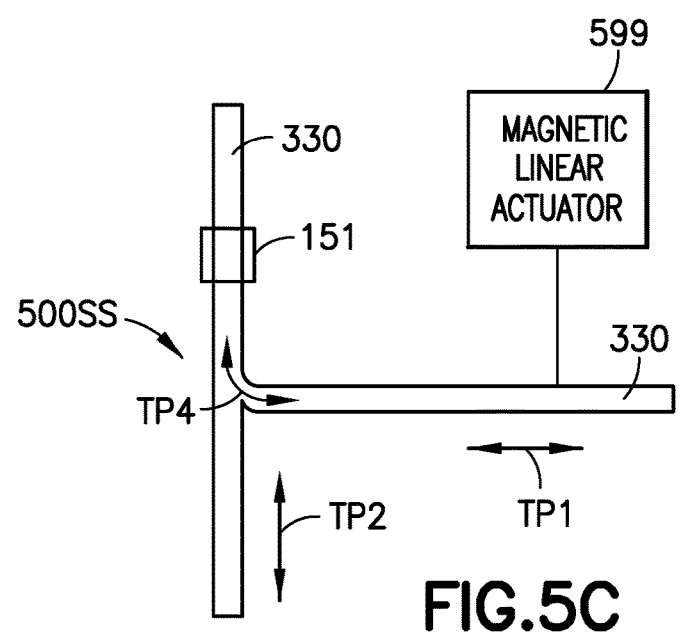
Figure 5D:
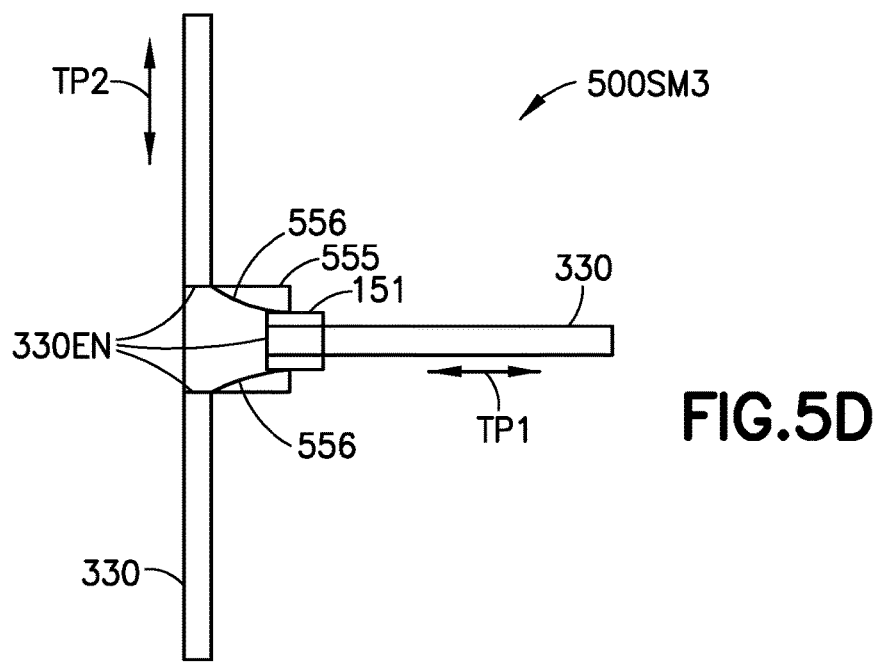

The switch 500S is any suitable switch that effects a change from the one labware bulk overhead transport path 166, 166MA, 166 MB, 166MC, 166MD the other different labware bulk overhead transport path 166, 166MA, 166 MB, 166MC, 166MD. As non-limiting examples, the switch 500S may be a mechanical switch or a solid state switch. Examples of mechanical switches 500SM1, 500SM2, 500SM3 are illustrated in FIGS. 5A, 5B, and 5D while an example of a solid state switch 500SS is illustrated in FIG. 5C. In one aspect, the mechanical switch 500SM1 is configured as a turn-table or rotary switch that includes a frame 501 and a turn-table 502 rotatably coupled to the frame 501. The turn-table 502 includes a portion of labware bulk transport system support 330P that rotates with the turn table 502 as a unit so that a transport path TP3 defined by the portion of labware bulk transport system support 330P rotates so as to be aligned with transport path TP1 (which is representative of any one of labware bulk overhead transport paths 166, 166MA, 166 MB, 166MC, 166MD) or transport path TP2 (which is representative of any other one of labware bulk overhead transport paths 166, 166MA, 166 MB, 166MC, 166MD). As an example of transport path switching with the mechanical switch 500SM1, with the turn-table 502 rotated so that the transport path TP3 is substantially aligned with the transport path TP1, the movable part 151 travels along transport path TP1 and transitions from transport path TP1 to transport path TP3 so as to be supported by the portion of labware bulk transport system support 330P. The controller 199 commands rotation of the turn-table 502 so that the transport path TP3 is aligned with the transport path TP2 so that the movable part traverses along the portion of labware bulk transport system support 330P so as to transition from transport path TP3 to transport path TP2. Transition from transport path TP2 to transport path TP1 is effected with the mechanical switch 500SM1 in a manner substantially opposite to that described above.

In another aspect, as shown in FIG. 5B, the mechanical switch 500SM2 is configured as an arm-type transfer mechanism. Here, the mechanical switch 500SM2 includes a frame 511 and an actuator 512 coupled to the frame 511. The actuator 512 includes an end effector 513 configured to transition the movable part 151 between transport path TP1 and transport path TP2. For example, the transport path TP1 is configured so that a portion of the transport path TP1 extends substantially alongside (e.g., substantially parallel) with transport path TP2. In one aspect, the actuator 512 is configured to move the end effector 513 (e.g., under control of controller 199) so that the end effector 513 disengages the movable part 151 from being supported along transport path TP1 (or transport path TP2), transfers the movable part 151 to transport path TP2 (or transport path TP1), and engages the movable part 151 so that the movable part 151 is supported along transport path TP2 (or transport path TP1). The disengagement and engagement of the movable part 151 from and to the transport paths TP1, TP2 may depend on the configuration of the substantially continuous labware support 330. For example, where the substantially continuous labware support 330 includes a slot in which a portion of the movable part is inserted for coupling the movable part to the substantially continuous labware support 330, the end effector 513 is configured in any suitable manner to remove disengage the movable part from the slot of one transport path TP1, TP2 and insert the movable part into the slot of the other transport path TP1, TP2. As another example, where the movable part rides along a substantially flat surface, the end effector 513 is configured to push/pull the movable part across the substantially flat surface so as to move the movable part between the transport paths TP1, TP2.

Still referring to FIG. 5B, in another aspect, the actuator 512 is configured to move the end effector 513 (e.g., under control of controller 199) so that the end effector 513 picks labware 170 from the movable part on transport path TP2 and places the labware in another different movable part 151 on transport path TP1. Here, movable part 151 on transport path TP2 is positioned so as to be in alignment with the end effector 513 so that the end effector 513 is moved to enter the movable part 151 and pick labware from the movable part on transport path TP2. The movable part 151 travels along transport path TP2 away from the actuator 512 and the other different movable part 151 on transport path TP1 is positioned so as to be in alignment with the end effector 513. The end effector 513 is moved to enter the other different movable part 151, positioned on transport path TP1, and place the labware 170 to the other different movable part 151 for transport along transport path TP1. Transfer of labware from transport path TP1 to transport path TP2 may occur in a substantially opposite manner to that described above.

Referring to FIG. 5D, the switch 500SM3 includes a multidirectional roller bed 555 that effects transfer of the movable part 151 from the substantially continuous labware support 330 of transport path TP2 to the substantially continuous labware support 330 of transport path TP1 and vice versa. For example, the multidirectional roller bed 555 is positioned (e.g., vertically and/or horizontally) relative to the substantially continuous labware supports 330 so that traverse of the movable part 151 past an end 330EN transfers support of the movable part between the continuous labware supports 330 and the multidirectional roller bed 555. For example, the movable part 151 may be supported from its top by the substantially continuous labware supports 330 (e.g., the movable part 151 hangs down from the substantially continuous labware supports 330) while the movable part 151 is supported from its bottom by the multidirectional roller bed 555 (e.g., the movable part sits on top of the multidirectional roller bed 555). As the movable part 151 traverses off of a substantially continuous labware supports 330 the movable part 151 transitions from being supported by its top (e.g., by the substantially continuous labware supports 330) to being supported by its bottom (e.g., by the multidirectional roller bed) and vice versa for movable part 151 transition from the multidirectional roller bed 555 to the substantially continuous labware supports 330. To guide movement of the movable part 151 between the substantially continuous labware supports 330 that are communicably coupled to each other through the multidirectional roller bed 555, the multidirectional roller bed 555 includes one or more guides 556 that are configured to guide movement of and orient the movable part to the substantially continuous labware supports 330 to which the moveable part is being transferred.

In still another aspect, as illustrated in FIG. 5C, the solid state switch 500SS lacks moving parts, such as where at least a portion (e.g., at least the portion that includes the intersection of transport paths TP1, TP2) of the substantially continuous labware support 330 includes magnetic linear actuator/conveyance 599 for driving the at least one movable part 151. Here, the magnetic linear actuator 599 defines a merger transport path TP4 that extends at least in part along (i.e., is common to) both transport paths TP1, TP2 so as to form a merger between transport path TP1 and transport path TP2. The magnetic linear actuator 599 is controlled by the controller 199 to effect a transition of the movable part 151 from one of transport paths TP1, TP2 to merger transport path TP4, and from merger transport path TP4 to the other one of transport paths TP1, TP2.

Figure 5E:
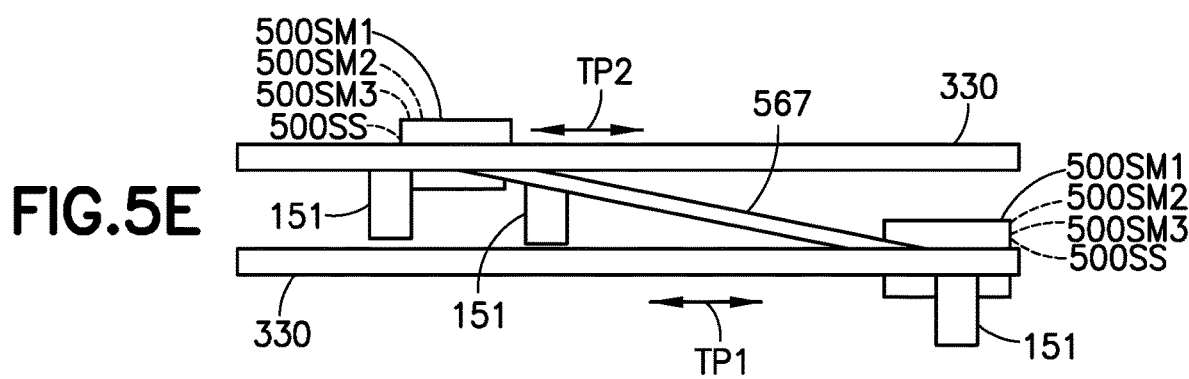
FIGS. 5E and 5F are exemplary schematic elevation illustrations of portions of the laboratory facility of FIG. 1 in accordance with aspects of the disclosed embodiment.
Figure 5F:
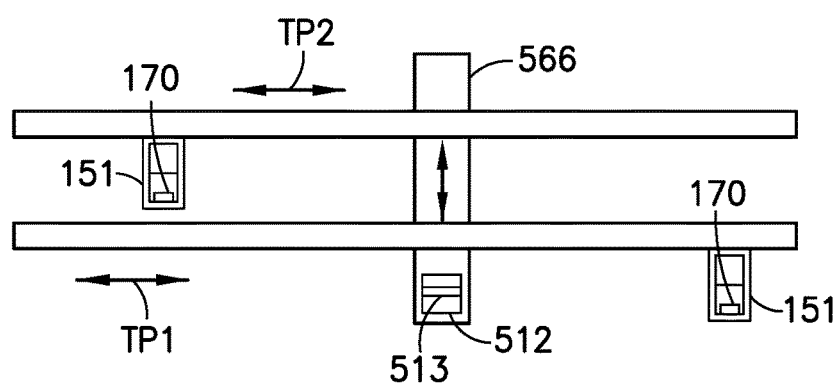

While the switches 500SM1-500SM3, 500SS are described herein as providing a horizontal transfer of labware 170 and/or movable parts 151 between transport paths, the switches 500S may also be configured for a vertical transfer of labware 170 and/or movable parts 151 between vertically stacked or spaced transport paths. Referring to FIGS. 5E and 5F the switches 500S may also be configured as composite switches 500SC1, 500SC2 (which may be substantially similar to the lift modules 185) that include one or more of the switches 500SM1-500SM3, 500SS coupled with a ramp 567 (FIG. 5E) and/or an elevator 566 (FIG. 5F). Referring to FIG. 5E, the transport paths TP1, TP2 are vertically spaced from one another and the ramp 567 extends between the respective substantially continuous labware supports 330 of the transport paths TP1, TP2. The ends of the ramp 567 are communicably coupled to the substantially continuous labware supports 330 by a respective switch 500SM1-500SM3, 500SS where the switch effects transition of the movable part 151 between the ramp 567 and the substantially continuous labware supports 330 while the ramp effects transition of the movable part between the transport paths TP1, TP2. As may be realized, in one or more aspects, the ramp 567 may include a captive movable part 151 that serves to transfer labware between movable parts travelling along the transport paths TP1, TP2 where end effector 513 of switch 500SM2 (located at each end of the ramp 567) transfers labware between the captive movable part 151 and the movable parts travelling along the transport paths TP1, TP2 in a manner substantially similar to that described herein with respect to FIG. 5B.

With reference to FIG. 5F, the transport paths TP1, TP2 are vertically spaced from one another and elevator 566 extends vertically adjacent or juxtaposed the respective substantially continuous labware supports 330 of the transport paths TP1, TP2. Here the elevator 566 includes the actuator 512 and end effector 513 thereof where the elevator lifts and lowers the actuator for alignment with the movable parts 151 travelling along transport paths TP1, TP2 (e.g., effecting transfer of labware 170 between the elevator and the movable parts 151). In a manner similar to that described above with respect to FIG. 5B, the movable parts 151 on transport paths TP1, TP2 are positioned along the respective transport path TP1, TP2 so that the end effector 513 extends into the movable part 151 for transferring labware to and from the movable part 151. Transfer of labware 170 removed from movable parts 151 on transport path TP1 to movable parts 151 on transport path TP2 (and vice versa) is effected with vertical travel of the elevator 566. As may be realized, where the actuator 512 is configured to transport movable parts 151 (as described herein with respect to FIG. 5B) the movable parts 151 may be transferred between transport paths TP1, TP2 by the elevator 566.

It is noted that the modular labware transport system 150 (and the labware bulk overhead transport system modules 150M thereof) may include any suitable combination of the switch 500S types described herein (or any other suitable types of switches). These types of switches may be employed with the substantially continuous labware support 330 having any suitable drive/actuators (such as those described herein) for driving the movable part 151 along the respective transport path TP1, TP2, where in some aspects the drive of the substantially continuous labware support 330 may change from one drive type to another drive type that matches the drive type of the switch 500S; while in other aspects, the switch 500S and the substantially continuous labware support 330 are configured to handoff the movable part 151 from the drive of the substantially continuous labware support 330 to the drive of the switch 500S and vice versa.

As described above, each labware bulk transport system module 150M, 150MA, 150MB, 150MC, 150MD is configured to maintain the undisrupted transport of the labware 170 throughout the respective labware bulk overhead transport paths 166, 166MA, 166 MB, 166MC, 166MD. Examples of labware bulk transport system module 150M, 150MA, 150MB, 150MC, 150MD configurations for effecting the undisrupted transport of the labware 170 are illustrated in FIGS. 6-9. For exemplary purposes only, the labware bulk transport system module 150M, 150MA, 150MB, 150MC, 150MD may be configured as loops (see, e.g., FIGS. 1, 2, 6-8), trees (see FIG. 9), or any other suitable shape that facilitates undisrupted transport of the labware 170 throughout the respective labware bulk overhead transport paths 166, 166MA, 166 MB, 166MC, 166MD.

Figure 6:
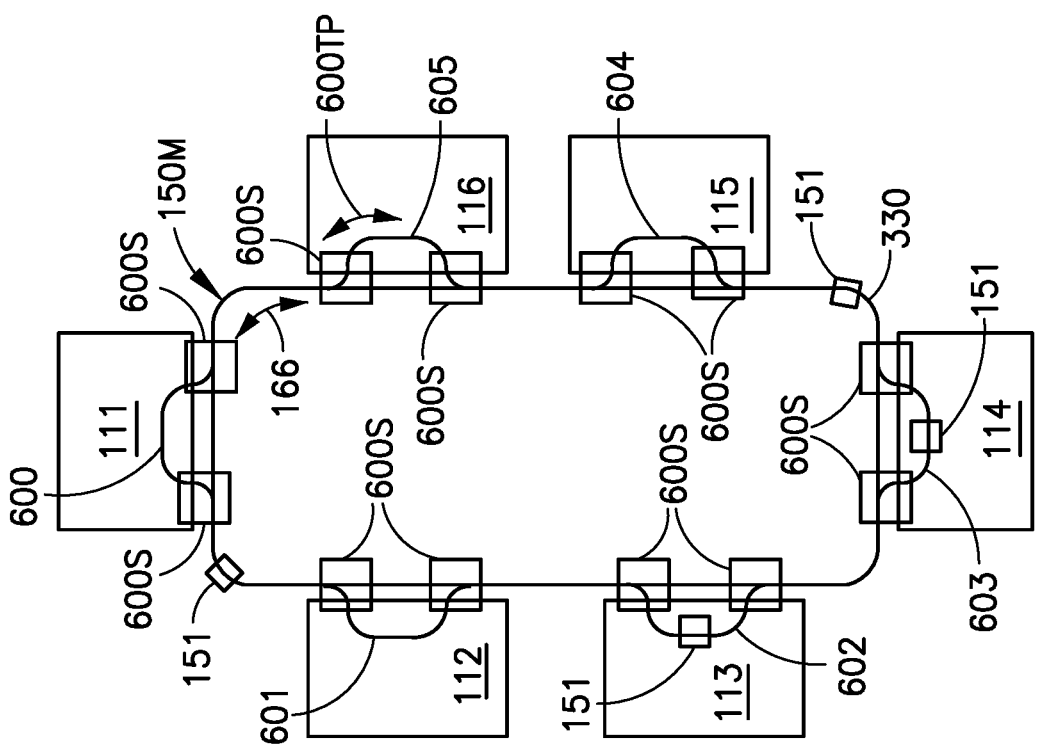
FIG. 6 is schematic plan illustration of a portion of the laboratory facility of FIG. 1 in accordance with aspects of the disclosed embodiment.

Referring to FIG. 6, the labware bulk transport system module 150M (which may be substantially similar to any one or more of labware bulk transport system module 150MA, 150MB, 150MC, 150MD) includes the substantially continuous labware support 330 which forms a loop having processing units 111-116 (or processing units 121-126, 131-136) disposed adjacent the substantially continuous labware support 330. In this aspect, the substantially continuous labware support 330 includes labware interfaces or spurs 600-605 that extend from the substantially continuous labware support 330 at each interface location between the substantially continuous labware support 330 and the processing units 111-116. Each end of each labware interface 600-605 includes a switch 600S (which is substantially similar to the switches 500S described herein) that effects transfer of the movable part 151 between the (main) transport path 166 of the substantially continuous labware support 330 and a transport path 600TP of a respective labware interface 600-605. The labware interfaces 600-605 provide for stopping of a movable part 151 for interface of labware carried/supported by the movable part 151 with a processing unit 111-116 (as that interface is described herein) while maintaining the undisrupted transport of the labware 170 along the (main) transport path 166.

Figure 7:
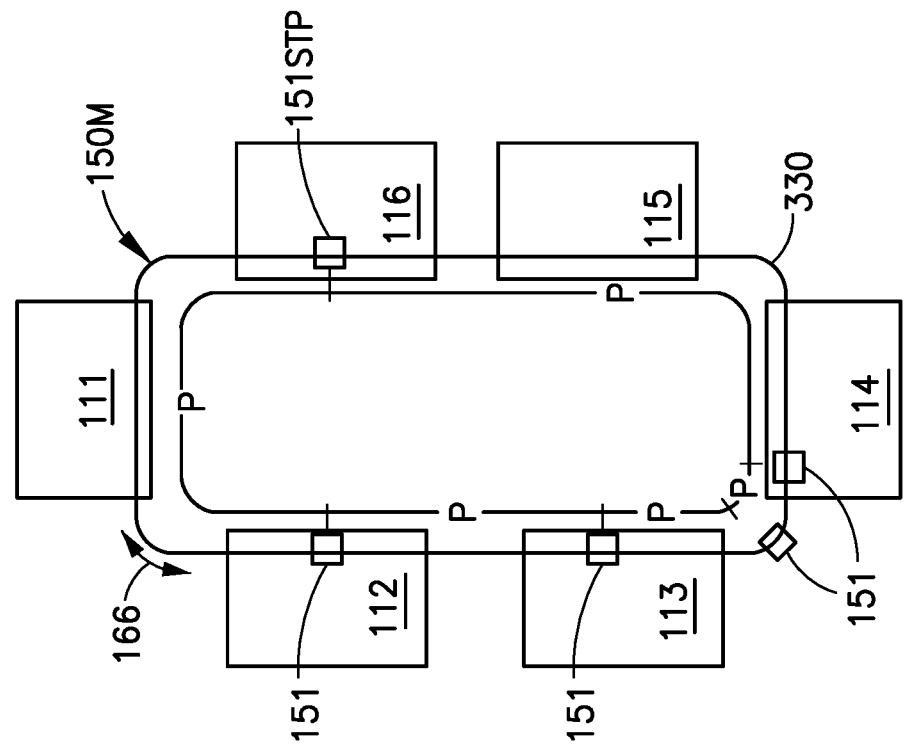
FIG. 7 is schematic plan illustration of a portion of the laboratory facility of FIG. 1 in accordance with aspects of the disclosed embodiment.

In FIG. 7, the labware bulk transport system module 150M (which may be substantially similar to any one or more of labware bulk transport system module 150MA, 150MB, 150MC, 150MD) includes the substantially continuous labware support 330 which forms a loop having processing units 111-116 (or processing units 121-126, 131-136) disposed underneath the substantially continuous labware support 330. Here the substantially continuous labware support 330 may be configured with a magnetic actuator (such as magnetic actuator 599) that provides for movement of each movable part 151 independent of movement of each other movable part 151 travelling along the transport path 166 of the substantially continuous labware support 330. The controller 199 may control the speed of each movable part 151 and the pitch P between adjacent movable parts 151 so that at least one movable part (see movable part 151STP) can be stopped along the transfer path 166 so as to interface labware 170 with a processing unit 111-116 (such as processing unit 116) while maintaining the undisrupted transport of the labware 170 carried by the other movable parts along the (main) transport path 166.

Figure 8:
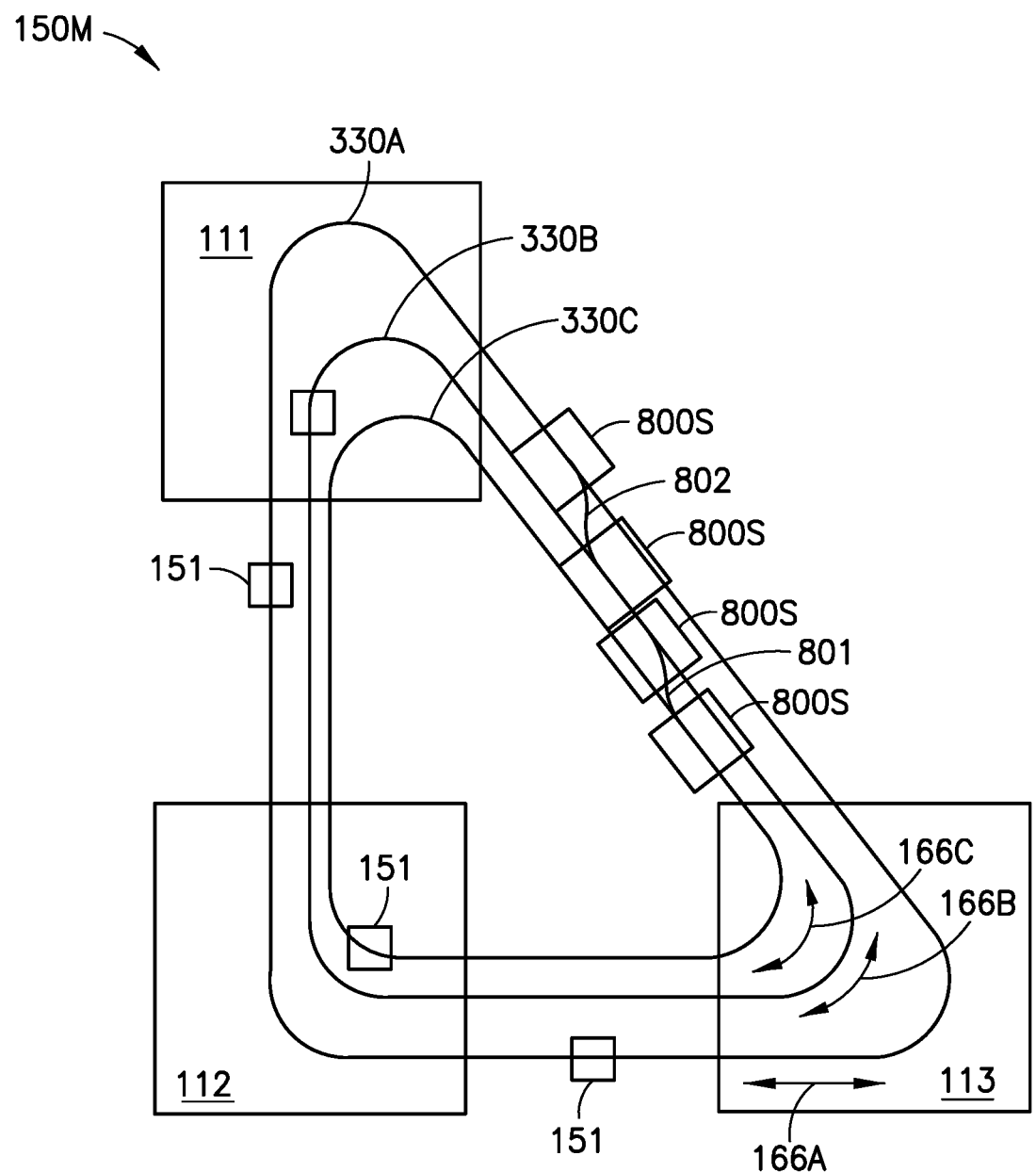
FIG. 8 is schematic plan illustration of a portion of the laboratory facility of FIG. 1 in accordance with aspects of the disclosed embodiment.
Figure 9:
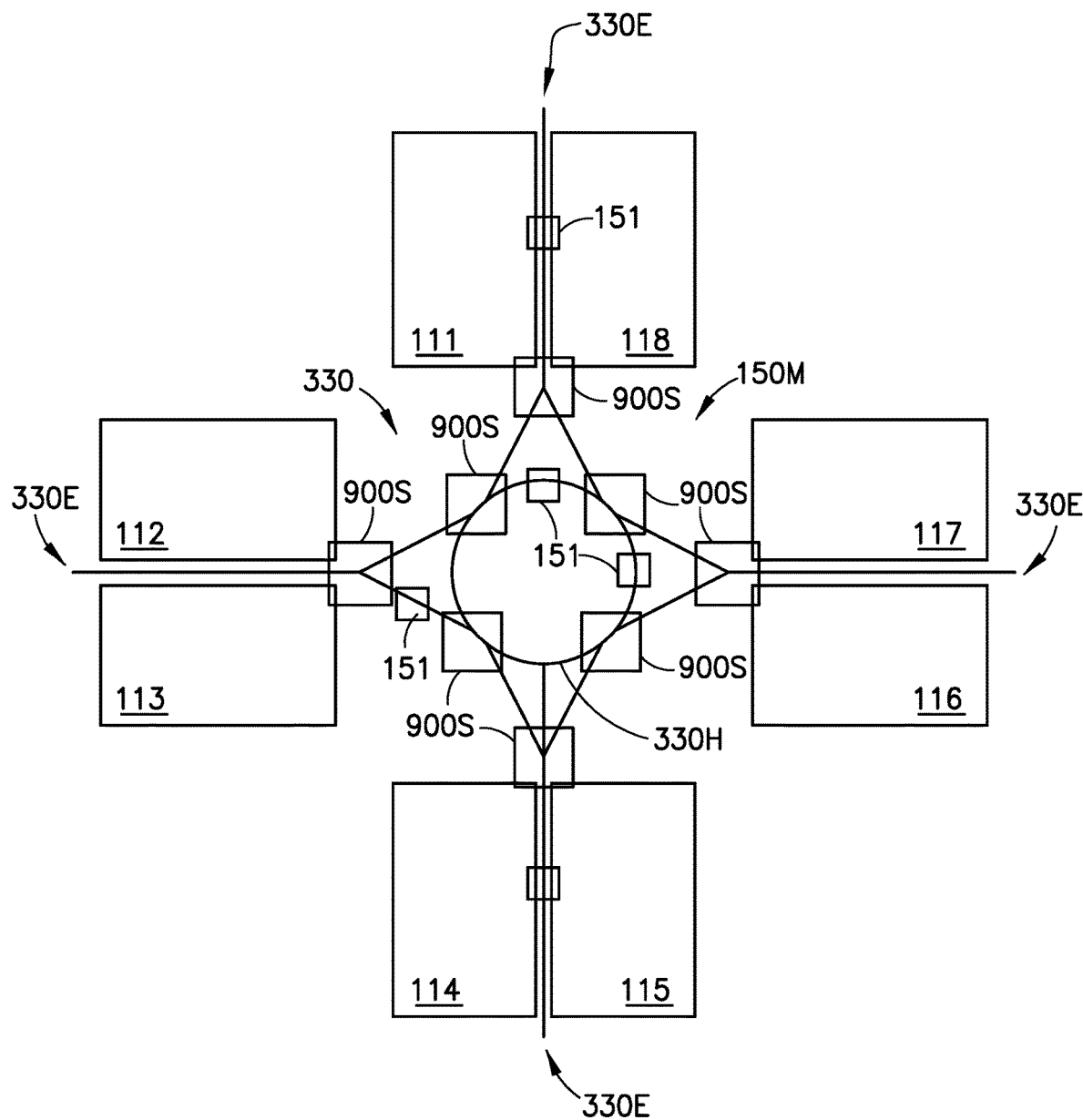
FIG. 9 is schematic plan illustration of a portion of the laboratory facility of FIG. 1 in accordance with aspects of the disclosed embodiment.

In FIG. 8, the labware bulk transport system module 150M (which may be substantially similar to any one or more of labware bulk transport system module 150MA, 150MB, 150MC, 150MD) includes multiple substantially continuous labware supports 330A, 330B, 330C arranged substantially adjacent one another so that each substantially continuous labware support 330A, 330B, 330C which forms a respective loop having processing units 111-116 (or processing units 121-126, 131-136) disposed underneath the substantially continuous labware supports 330A, 330B, 330C. Each of the substantially continuous labware support 330A, 330B, 330C has a respective transport path 166A, 166B, 166C along which movable parts 151 travel. In one aspect, each of the substantially continuous labware supports 330A, 330B, 330C may be substantially similar to that described above with respect to FIG. 7, where the speed and pitch between the movable parts is controlled by controller 199 to effect labware interface with the processing units 111-113 (three processing units are illustrated here for exemplary purposes and in other aspects there may be more or less than three) in the manner described above. In other aspects, shunts 801, 802 are provided between the substantially continuous labware supports 330A, 330B, 330C so as to effect switching of the movable parts 151 from one substantially continuous labware supports 330A, 330B, 330C to another different substantially continuous labware supports 330A, 330B, 330C. Here, the ends of the shunts 801, 802 include switches 800S that are substantially similar to the switches described herein. Switching the movable parts 151 between the substantially continuous labware supports 330A, 330B, 330C provides for at least one movable part 151 to stop on one of the substantially continuous labware supports 330A, 330B, 330C for interface of the labware 170 carried by the movable part with a processing unit 111-113 while the other movable parts 151 traverse to the another different substantially continuous labware supports 330A, 330B, 330C for maintaining the undisrupted transport of the labware 170 carried by the other movable parts along the transport paths 166A, 166B, 166C of the other different substantially continuous labware supports 330A, 330B, 330C.

In FIG. 8, the labware bulk transport system module 150M (which may be substantially similar to any one or more of labware bulk transport system module 150MA, 150MB, 150MC, 150MD) includes a substantially continuous labware support 330 that forms a central hub 330H having interface extensions 330E extending from the central hub 330H. The interface extensions 330E are illustrated as extending radially from the central hub 330H but in other aspects the interface extensions 330E can extend from the central hub 330H with in any suitable arrangement relative to the central hub 330H. Processing units 111-118 (which are similar to the processing units described herein) disposed adjacent respective interface extensions 330E. The movable parts 151 transition between travel along a transport path defined by the central hub 330H and transport paths defined by respective interface extensions 330E through switches 900S, which switches 900S are substantially similar to those described herein. Here, the movable parts 151 may travel along the transport path of the central hub 330H so as to maintain the undisrupted transport of the labware 170 while at least one movable part 151 transitions to travel along an interface extension 330E for interface of the labware 170 carried by the movable part 151 with a processing unit 111-118.

Referring again to FIGS. 1-4, the aspects of the disclosed embodiment provide for a labware 170 processing arrangement where the modular labware transport system 150 services the integrated labware process machine(s) 210-213 and/or the standalone instrument(s) 200, 201, 203, 204 of one or more laboratories 110, 120, 130 of a laboratory facility 100. Here, the modular labware transport system 150 includes at least one inter-laboratory transport portion 150INT and at least one infra-laboratory transport portion 150INF. The infra-laboratory transport portion(s) 150INF and the inter-laboratory transport portion(s) 150INT, as described herein, provide for the undisrupted transport of labware 170.

The inter-laboratory transport portion 150INT communicably couples one laboratory 110, 120, 130 to another different laboratory 110, 120, 130 so that labware 170 is transferred between the different laboratories 110, 120, 130. The substantially continuous labware support 330 of the inter-laboratory transport portion 150INT may be modular so that a length of the substantially continuous labware support 330 may be expanded to add additional laboratories or reduced to remove laboratories from the laboratory facility 100. The inter-laboratory transport portion 150INT may also be coupled to other different inter-laboratory transport portions 150INT (such as through switches substantially similar to those described herein) also to expand the number of laboratories and processing capability of the laboratory facility 100. It is noted that the arrangement of the laboratories 110, 120, 130 relative to the inter-laboratory transport portion 150INT are exemplary only and in other aspects, the inter-laboratory transport portion 150INT may have any suitable shape and have any suitable number of laboratories coupled thereto.

The infra-laboratory transport portion 150INF communicably couples the integrated labware process machine(s) 210-213 and/or the standalone instrument(s) 200, 201, 203, 204 of a respective laboratory 110, 120, 130 to each other so that labware 170 is transferred between the integrated labware process machine(s) 210-213 and/or the standalone instrument(s) 200, 201, 203, 204 of the respective laboratory 110, 120, 130. The substantially continuous labware support 330 of the infra-laboratory transport portion 150INF may be modular so that a length of the substantially continuous labware support 330 may be expanded to add additional integrated labware process machine(s) 210-213 and/or standalone instrument(s) 200, 201, 203, 204 or reduced to remove integrated labware process machine(s) 210-213 and/or standalone instrument(s) 200, 201, 203, 204 from the laboratory facility 100. It is noted that the arrangement of the integrated labware process machine(s) 210-213 and/or standalone instrument(s) 200, 201, 203, 204 relative to the infra-laboratory transport portion 150INF are exemplary only and in other aspects, the infra-laboratory transport portion 150INF may have any suitable shape and have any suitable number of integrated labware process machine(s) and/or standalone instrument(s) coupled thereto.

As described herein, the respective substantially continuous labware supports 330 of the infra-laboratory transport portion(s) 150INF and the inter-laboratory transport portion(s) 150INT provide labware 170 access to all integrated labware process machine(s) 210-213 and/or standalone instrument(s) 200, 201, 203, 204 of the laboratory facility 100 as well as any storage 180 or buffer locations disposed underneath or juxtaposed, for example, the inter-laboratory transport portion(s) 150INT (see FIG. 1). The infra-laboratory transport portion(s) 150INF and the inter-laboratory transport portion(s) 150INT are both formed in selectably installable portions MIP (only some of which are identified in FIG. 1 but it is noted that straight portions of the substantially continuous labware supports 330 may be provided in modular lengths, curved portions of the substantially continuous labware supports 330 may be provided in modular lengths, the switches 500S may be provided as modules, the spurs 601 may be provided as modules, the movable parts 151 may be provided as modules, etc.) capable of selectable installation along the modular labware transport system 150. In the aspects of the disclosed embodiment, the modular sections of the infra-laboratory transport portion(s) 150INF and the inter-laboratory transport portion(s) 150INT may be modular for ease of installation and/or for ease of expansion/reduction of the processing capacity of the laboratory facility 100 as described herein.

In the aspects of the disclosed embodiment, the modular sections of the infra-laboratory transport portion(s) 150INF and the inter-laboratory transport portion(s) 150INT may also provide for ease of increased throughput at substantially parallel travel paths may be provided to one or more of the integrated labware process machine 210-213 or standalone instrument 200, 201, 203, 204 to increase throughput of labware to and from the one or more of the integrated labware process machine 210-213 or standalone instrument 200, 201, 203, 204. For example, the throughput rate of labware 170 provided by the inter-laboratory transport portion(s) 150INT may be commensurate with the throughput rate of a lab 110, 120, 130 and/or the throughput rate of labware provided by the infra-laboratory transport portion(s) 150INF may be commensurate with a throughput rate of any given one or more of the integrated labware process machine(s) 210-213 and/or standalone instrument(s) 200, 201, 203, 204 of a respective lab 110, 120, 130.

In addition, switches 500S may be added between modular sections of the substantially continuous labware supports 330 to create shunts 181 (FIG. 1) between sides of the infra-laboratory transport portion(s) 150INF and the inter-laboratory transport portion(s) 150INT to shorten a distance travelled by the movable parts 151 or to avoid obstructions.

Referring to FIGS. 1-3, as a brief example, a multi-well plate 179 is prepared on, e.g., a compound management system 300 (e.g., corresponding to processing unit 111 of lab 110). The robot 301 of the compound management system 300 places the multi-well plate 179 substantially directly to a nest or movable part 151 of the labware bulk overhead transport system module 150M. The movable part 151 travels along the labware bulk overhead transport system module 150M to transport the multi-well plate 179 to, e.g., a screening system (e.g., corresponding to another processing unit 112-116 of lab 110 or processing unit 121-126, 131-136 of lab 120, 130) where a robot of the screening system removes the multi-well plate 179 from the movable part 151 for processing at the screening system. Once screening is complete, the screening system robot places the multi-well plate 179 to the same or different movable part 151 so that the labware bulk overhead transport system module 150M transports the screened multi-well plate 179 to a benchtop reader where a robot of the benchtop reader picks the multi-well plate substantially directly from the movable part 151 for processing at the reader. With reading of the multi-well plate 179 complete, the robot of the benchtop reader places the multi-well plate 179 to the same or different movable part 151 for transport to another location of the laboratory, such as a storage 180 or any other suitable location of the laboratory.

Figure 10:
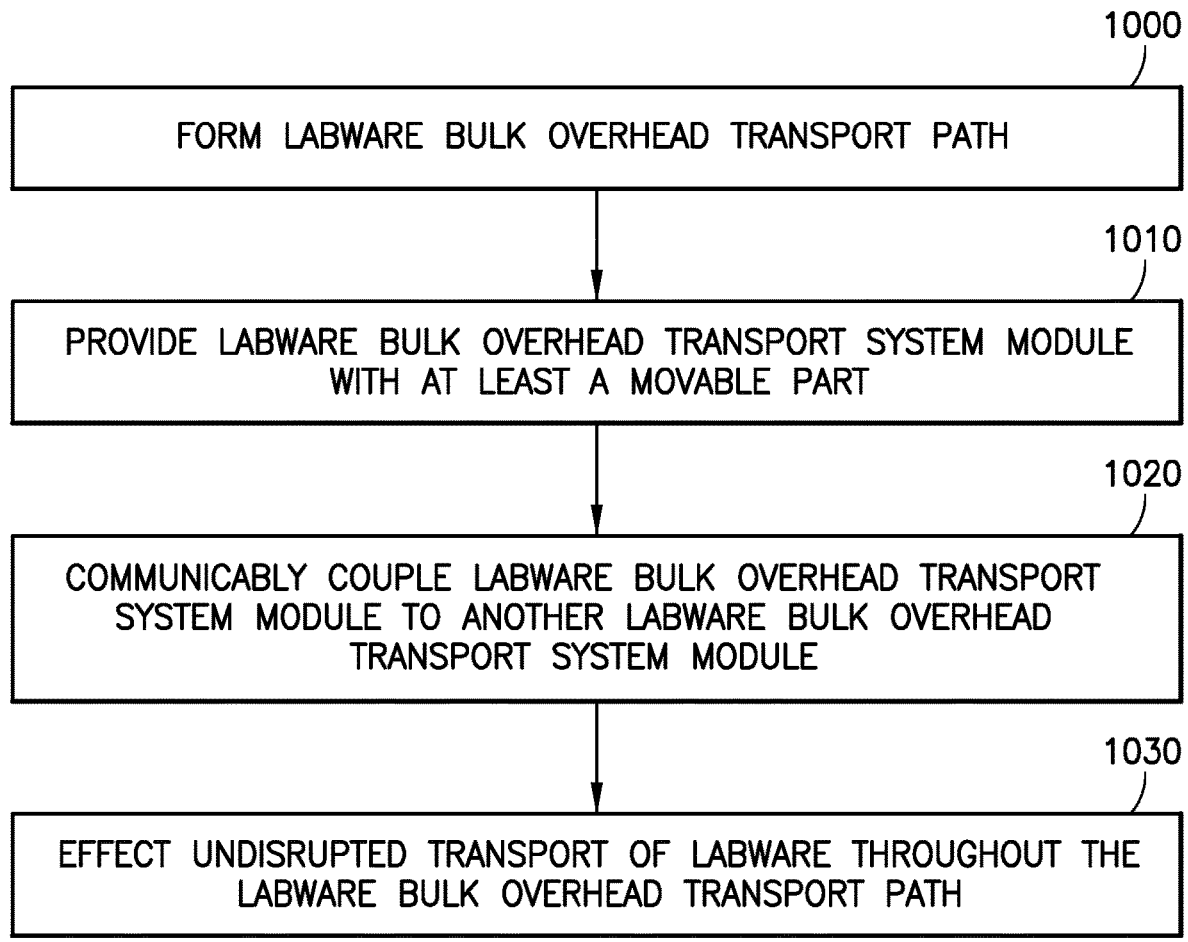
FIG. 10 is a schematic block diagram of a method in accordance with aspects of the disclosed embodiment.

Referring to FIGS. 1-4 and 10, an exemplary method of selectably configuring a modular labware transport system 150 will be described in accordance with the aspects of the disclosed embodiment. In the method, a labware bulk overhead transport path 166 is formed (FIG. 10, Block 1000), with a labware bulk overhead transport system module 150M, 150MA, 150MB, 150MC, 150MD, that connects at least one integrated labware process machine/appliance 210-213 or a standalone/benchtop instrument 200, 201, 203, 204 to at least another different, integrated labware process machine/appliance 210-213 or standalone/benchtop instrument 200, 201, 203, 204, separated at a distance along the labware bulk overhead transport path 166, 166MA, 166 MB, 166MC, 166MD. The labware bulk overhead transport system module 150M, 150MA, 150MB, 150MC, 150MD is provided with at least a movable part 151 (FIG. 10, Block 1010), where the labware bulk overhead transport system module 150M, 150MA, 150MB, 150MC, 150MD has a substantially continuous labware support 330 extending longitudinally along the labware bulk overhead transport path 166, 166MA, 166 MB, 166MC, 166MD, with the movable part 151 of the substantially continuous labware support 330 being, disposed so as to support labware 170 thereon, and being movable longitudinally so as to define the labware bulk overhead transport path 166, 166MA, 166 MB, 166MC, 166MD of the labware 170 supported on the labware bulk overhead transport system module 150M, 150MA, 150MB, 150MC, 150MD. As described herein, the substantially continuous labware support 330 has more than one predetermined labware holding stations 311-313 disposed to hold a labware piece (as described herein), of the labware 170 supported on the substantially continuous labware support 330. As also described herein, each of the predetermined labware holding stations 311-313 has a different predetermined location along the substantially continuous labware support 330 and labware bulk overhead transport path 166, 166MA, 166 MB, 166MC, 166MD. The labware bulk overhead transport system module 150M is communicably coupled to another labware bulk overhead transport system module 150M, 150MA, 150MB, 150MC, 150MD of the modular labware transport system 150 (FIG. 10, Block 1020). The other labware bulk overhead transport system module 150M, 150MA, 150MB, 150MC, 150MD forms another different labware bulk overhead transport path 166, 166MA, 166 MB, 166MC, 166MD that is different/separate and distinct from the labware bulk overhead transport path 166, 166MA, 166 MB, 166MC, 166MD of the labware bulk overhead transport system module 150M, 150MA, 150MB, 150MC, 150MD. Undisrupted transport of the labware 170 throughout the labware bulk overhead transport path 166, 166MA, 166 MB, 166MC, 166MD is effected (FIG. 10, Block 1030) with the labware bulk overhead transport system module 150M, 150MA, 150MB, 150MC, 150MD both coupled to and uncoupled from the other labware bulk overhead transport system module 150M, 150MA, 150MB, 150MC, 150MD.

In accordance with one or more aspects of the present disclosure a selectably configurable modular labware transport system comprises:
- a labware bulk overhead transport system module forming a labware bulk overhead transport path connecting at least one integrated labware process machine/appliance or a standalone/benchtop instrument to at least another different, integrated labware process machine/appliance or standalone/benchtop instrument, separated at a distance along the labware bulk overhead transport path;
- wherein the labware bulk overhead transport system module has a substantially continuous labware support extending longitudinally along the labware bulk overhead transport path, with at least a movable part of the substantially continuous labware support being, disposed so as to support labware thereon, and movable longitudinally defining the labware bulk overhead transport path of the labware supported on the labware bulk overhead transport system module;
- wherein the substantially continuous labware support has more than one predetermined labware holding stations disposed to hold a labware piece, of the labware supported on the substantially continuous labware support, each of the predetermined labware holding stations having a different predetermined location along the substantially continuous labware support and labware bulk overhead transport path; and
- the labware bulk overhead transport system module is arranged so as to be communicably coupled to another labware bulk overhead transport system module of the modular labware transport system that forms another different labware bulk overhead transport path separate and distinct from the labware bulk overhead transport path of the labware bulk overhead transport system module, and effects undisrupted transport of the labware throughout the labware bulk overhead transport path with the labware bulk overhead transport system module both coupled to and uncoupled from the other labware bulk overhead transport system module.

In accordance with one or more aspects of the present disclosure coupling of the labware bulk overhead transport system module and the other labware bulk overhead transport system module defines a labware transfer junction, effecting transfer of the labware between the labware bulk overhead transport system module and other labware bulk overhead transport system module.

In accordance with one or more aspects of the present disclosure the coupling defines a switch for labware switching from the labware bulk overhead transport path to the other different labware bulk overhead transport path.

In accordance with one or more aspects of the present disclosure the other labware bulk overhead transport system module is another labware bulk overhead transport system module, on common level with the labware bulk overhead transport system module, or a lift or lifting conveyor module arranged so as to couple the labware bulk overhead transport system module at one level to another different level above or below the one level.

In accordance with one or more aspects of the present disclosure the other different labware bulk overhead transport system module includes another labware bulk overhead transport system module, joined to the labware bulk overhead transport system module at one location of a common level, and includes at least one lift or lifting conveyor module joined to at least one of the labware bulk overhead transport system module or the other labware bulk overhead transport system module.

In accordance with one or more aspects of the present disclosure each of the predetermined labware holding stations of the substantially continuous labware support includes the at least movable part so that the predetermined labware holding station, and predetermined location, moves along the labware bulk overhead transport path.

In accordance with one or more aspects of the present disclosure selectably configurable modular labware transport system further comprises a controller communicably coupled to the labware bulk overhead transport system module and configured so as to locate each labware holding station, moving along the labware bulk overhead transport path, with respect to the at least one integrated labware process machine/appliance, and command a bot arm, associated with the at least one integrated labware process machine/appliance to effect load and unload of the labware onto and off the substantially continuous labware support of a predetermined labware holding station with the predetermined labware holding station positioned within a range of motion of the bot arm.

In accordance with one or more aspects of the present disclosure the controller is configured to register an identity of the labware loaded or unloaded by the bot arm to or from the predetermined labware holding station.

In accordance with one or more aspects of the present disclosure the predetermined labware holding station is located adjacent to the at least one integrated labware process machine/appliance at load and unload of the labware from the predetermined labware holding station.

In accordance with one or more aspects of the present disclosure the controller is configured to swap labware at the predetermined labware holding station, from labware with a first identity in registry to different labware with a second different identity in registry.

In accordance with one or more aspects of the present disclosure the controller is configured to move the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path.

In accordance with one or more aspects of the present disclosure the controller is configured to move the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path and at a different level of the facility.

In accordance with one or more aspects of the present disclosure method of selectably configuring a modular labware transport system is provided. The method comprises:
  forming a labware bulk overhead transport path, with a labware bulk overhead transport system module, that connects at least one integrated labware process machine/appliance or a standalone/benchtop instrument to at least another different, integrated labware process machine/appliance or standalone/benchtop instrument, separated at a distance along the labware bulk overhead transport path; and
  providing the labware bulk overhead transport system module with at least a movable part, where the labware bulk overhead transport system module has a substantially continuous labware support extending longitudinally along the labware bulk overhead transport path, with the movable part of the substantially continuous labware support being, disposed so as to support labware thereon, and being movable longitudinally so as to define the labware bulk overhead transport path of the labware supported on the labware bulk overhead transport system module, wherein
  the substantially continuous labware support has more than one predetermined labware holding stations disposed to hold a labware piece, of the labware supported on the substantially continuous labware support, each of the predetermined labware holding stations having a different predetermined location along the substantially continuous labware support and labware bulk overhead transport path;
  communicably coupling the labware bulk overhead transport system module to another labware bulk overhead transport system module of the modular labware transport system that forms another different labware bulk overhead transport path separate and distinct from the labware bulk overhead transport path of the labware bulk overhead transport system module; and
  effecting undisrupted transport of the labware throughout the labware bulk overhead transport path with the labware bulk overhead transport system module both coupled to and uncoupled from the other labware bulk overhead transport system module.

In accordance with one or more aspects of the present disclosure coupling of the labware bulk overhead transport system module and the other labware bulk overhead transport system module defines a labware transfer junction, effecting transfer of the labware between the labware bulk overhead transport system module and other labware bulk overhead transport system module.

In accordance with one or more aspects of the present disclosure the coupling defines a switch for labware switching from the labware bulk overhead transport path to the other different labware bulk overhead transport path.

In accordance with one or more aspects of the present disclosure the other labware bulk overhead transport system module is another labware bulk overhead transport system module, on common level with the labware bulk overhead transport system module, or a lift or lifting conveyor module arranged so as to couple the labware bulk overhead transport system module at one level to another different level above or below the one level.

In accordance with one or more aspects of the present disclosure the other different labware bulk overhead transport system module includes another labware bulk overhead transport system module, joined to the labware bulk overhead transport system module at one location of a common level, and includes at least one lift or lifting conveyor module joined to at least one of the labware bulk overhead transport system module or the other labware bulk overhead transport system module.

In accordance with one or more aspects of the present disclosure each of the predetermined labware holding stations of the substantially continuous labware support includes the at least movable part so that the predetermined labware holding station, and predetermined location, moves along the labware bulk overhead transport path.

In accordance with one or more aspects of the present disclosure the method further comprises:
  providing a controller communicably coupled to the labware bulk overhead transport system module;
  locating, with the controller, each labware holding station, moving along the labware bulk overhead transport path, with respect to the at least one integrated labware process machine/appliance; and
  commanding, with the controller, a bot arm, associated with the at least one integrated labware process machine/appliance to effect load and unload of the labware onto and off the substantially continuous labware support of a predetermined labware holding station with the predetermined labware holding station positioned within a range of motion of the bot arm.

In accordance with one or more aspects of the present disclosure the method further comprises, registering, with the controller, an identity of the labware loaded or unloaded by the bot arm to or from the predetermined labware holding station.

In accordance with one or more aspects of the present disclosure the predetermined labware holding station is located adjacent to the at least one integrated labware process machine/appliance at load and unload of the labware from the predetermined labware holding station.

In accordance with one or more aspects of the present disclosure the method further comprises, effecting, with the controller, a swapping of labware at the predetermined labware holding station, from labware with a first identity in registry to different labware with a second different identity in registry.

In accordance with one or more aspects of the present disclosure the method further comprises, moving, with the controller, the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path.

In accordance with one or more aspects of the present disclosure the method further comprises, moving, with the controller, the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path and at a different level of the facility.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A selectably configurable modular labware transport system comprising:
    a labware bulk overhead transport system module forming a labware bulk overhead transport path connecting at least one integrated labware process machine/appliance or a standalone/benchtop instrument to at least another different, integrated labware process machine/appliance or standalone/benchtop instrument, separated at a distance along the labware bulk overhead transport path;
    wherein the labware bulk overhead transport system module has a substantially continuous labware support extending longitudinally along the labware bulk overhead transport path, with at least a movable part of the substantially continuous labware support being, disposed so as to support labware thereon, and movable longitudinally defining the labware bulk overhead transport path of the labware supported on the labware bulk overhead transport system module;
    wherein the substantially continuous labware support has more than one predetermined labware holding station corresponding to the at least one moveable part and disposed to hold a labware piece, of the labware supported on the substantially continuous labware support, each of the predetermined labware holding stations having a different predetermined location along the substantially continuous labware support and labware bulk overhead transport path; and
    a lift module communicably coupled to the labware bulk overhead transport system module and arranged so as to couple the labware bulk overhead transport system module at one level to another different level above or below the one level.

2. The selectably configurable modular labware transport system of claim 1, wherein the lift module is fixed or mounted dependent from the labware bulk overhead transport system.

3. The selectably configurable modular labware transport system of claim 1, wherein the lift module is movably mounted to the labware bulk overhead transport system so as to be positioned and repositioned at different locations of the labware bulk overhead transport system.

4. The selectably configurable modular labware transport system of claim 1, wherein the lift module is an auto-navigating vehicle configured to opportunistically transfer the labware between the movable part and at least one of the integrated labware process machine/appliance or standalone/benchtop instrument.

5. The selectably configurable modular labware transport system of claim 1, wherein the lift module is arranged to transfer the labware from the movable part at the one level to at least one integrated labware process machine/appliance or standalone/benchtop instrument at the another different level above or below the one level.

6. The selectably configurable modular labware transport system of claim 1, wherein the labware bulk overhead transport system module is arranged so as to be communicably coupled to another labware bulk overhead transport system module of the modular labware transport system that forms another different labware bulk overhead transport path separate and distinct from the labware bulk overhead transport path of the labware bulk overhead transport system module, and effects undisrupted transport of the labware throughout the labware bulk overhead transport path with the labware bulk overhead transport system module both coupled to and uncoupled from the other labware bulk overhead transport system module.

7. The selectably configurable modular labware transport system of claim 6, wherein coupling of the labware bulk overhead transport system module and the other labware bulk overhead transport system module defines a labware transfer junction, effecting transfer of the labware between the labware bulk overhead transport system module and other labware bulk overhead transport system module.

8. The selectably configurable modular labware transport system of claim 7, wherein the coupling defines a switch for labware switching from the labware bulk overhead transport path to the other different labware bulk overhead transport path.

9. The selectably configurable modular labware transport system of claim 6, wherein the other labware bulk overhead transport system module is another labware bulk overhead transport system module, on common level with the labware bulk overhead transport system module, or a lift or lifting conveyor module arranged so as to couple the labware bulk overhead transport system module at one level to another different level above or below the one level.

10. The selectably configurable modular labware transport system of claim 6, wherein the other different labware bulk overhead transport system module includes another labware bulk overhead transport system module, joined to the labware bulk overhead transport system module at one location of a common level, and includes at least one lift or lifting conveyor module joined to at least one of the labware bulk overhead transport system module or the other labware bulk overhead transport system module.

11. The selectably configurable modular labware transport system of claim 1, wherein each of the predetermined labware holding stations of the substantially continuous labware support includes the at least movable part so that the predetermined labware holding station, and predetermined location, moves along the labware bulk overhead transport path.

12. The selectably configurable modular labware transport system of claim 1, further comprising a controller communicably coupled to the labware bulk overhead transport system module and configured so as to locate each labware holding station, moving along the labware bulk overhead transport path, with respect to the at least one integrated labware process machine/appliance, and command a bot arm, associated with the at least one integrated labware process machine/appliance to effect load and unload of the labware onto and off the substantially continuous labware support of a predetermined labware holding station with the predetermined labware holding station positioned within a range of motion of the bot arm.

13. The selectably configurable modular labware transport system of claim 12, wherein the controller is configured to register an identity of the labware loaded or unloaded by the bot arm to or from the predetermined labware holding station.

14. The selectably configurable modular labware transport system of claim 12, wherein the predetermined labware holding station is located adjacent to the at least one integrated labware process machine/appliance at load and unload of the labware from the predetermined labware holding station.

15. The selectably configurable modular labware transport system of claim 12, wherein the controller is configured to swap labware at the predetermined labware holding station, from labware with a first identity in registry to different labware with a second different identity in registry.

16. The selectably configurable modular labware transport system of claim 12, wherein the controller is configured to move the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path.

17. The selectably configurable modular labware transport system of claim 12, wherein the controller is configured to move the labware, loaded in the predetermined labware holding station, along the labware bulk overhead transport path from the at least one integrated labware process machine/appliance to the at least other different, integrated labware process machine/appliance or standalone/benchtop instrument, separated at a distance along the labware bulk overhead transport path and at a different level of the facility.

18. A method of selectably configuring a modular labware transport system, the method comprising:
forming a labware bulk overhead transport path, with a labware bulk overhead transport system module, that connects at least one integrated labware process machine/appliance or a standalone/benchtop instrument to at least another different, integrated labware process machine/appliance or standalone/benchtop instrument, separated at a distance along the labware bulk overhead transport path; and
providing the labware bulk overhead transport system module with at least a movable part, where the labware bulk overhead transport system module has a substantially continuous labware support extending longitudinally along the labware bulk overhead transport path, with the movable part of the substantially continuous labware support being, disposed so as to support labware thereon, and being movable longitudinally so as to define the labware bulk overhead transport path of the labware supported on the labware bulk overhead transport system module, wherein
the substantially continuous labware support has more than one predetermined labware holding station corresponding to the at least one movable part and disposed to hold a labware piece, of the labware supported on the substantially continuous labware support, each of the predetermined labware holding stations having a different predetermined location along the substantially continuous labware support and labware bulk overhead transport path; and
communicably coupling a lift module to the labware bulk overhead transport system module, and arranging the lift module so as to couple the labware bulk overhead transport system module at one level to another different level above or below the one level.

19. The method of claim 18, wherein the lift module is fixed or mounted dependent from the labware bulk overhead transport system.

20. The method of claim 18, further comprising movably mounting the lift module to the labware bulk overhead transport system for positioning and repositioning the lift module at different locations of the labware bulk overhead transport system.

21. The method of claim 18, wherein the lift module is an auto-navigating vehicle for opportunistically transferring the labware between the movable part and at least one of the integrated labware process machine/appliance or standalone/benchtop instrument.

22. The method of claim 18, wherein the lift module is arranged for transferring the labware from the movable part at the one level to at least one integrated labware process machine/appliance or standalone/benchtop instrument at the another different level above or below the one level.

23. The selectably configurable modular labware transport system of claim 18, further comprising
communicably coupling the labware bulk overhead transport system module to another labware bulk overhead transport system module of the modular labware transport system that forms another different labware bulk overhead transport path separate and distinct from the labware bulk overhead transport path of the labware bulk overhead transport system module; and
effecting undisrupted transport of the labware throughout the labware bulk overhead transport path with the labware bulk overhead transport system module both coupled to and uncoupled from the other labware bulk overhead transport system module.

24. The method of claim 23, wherein coupling of the labware bulk overhead transport system module and the other labware bulk overhead transport system module defines a labware transfer junction, effecting transfer of the labware between the labware bulk overhead transport system module and other labware bulk overhead transport system module.

25. The method of claim 24, wherein the coupling defines a switch for labware switching from the labware bulk overhead transport path to the other different labware bulk overhead transport path.

26. The method of claim 23, wherein the other labware bulk overhead transport system module is another labware bulk overhead transport system module, on common level with the labware bulk overhead transport system module, or a lift or lifting conveyor module arranged so as to couple the labware bulk overhead transport system module at one level to another different level above or below the one level.

27. The method of claim 23, wherein the other different labware bulk overhead transport system module includes another labware bulk overhead transport system module, joined to the labware bulk overhead transport system module at one location of a common level, and includes at least one lift or lifting conveyor module joined to at least one of the labware bulk overhead transport system module or the other labware bulk overhead transport system module.

28. The method of claim 23, wherein each of the predetermined labware holding stations of the substantially continuous labware support includes the at least movable part so that the predetermined labware holding station, and predetermined location, moves along the labware bulk overhead transport path.

29. The method of claim 23, further comprising:
providing a controller communicably coupled to the labware bulk overhead transport system module;
locating, with the controller, each labware holding station, moving along the labware bulk overhead transport path, with respect to the at least one integrated labware process machine/appliance; and
commanding, with the controller, a bot arm, associated with the at least one integrated labware process machine/appliance to effect load and unload of the labware onto and off the substantially continuous labware support of a predetermined labware holding station with the predetermined labware holding station positioned within a range of motion of the bot arm.

30. The method of claim 29, further comprising, registering, with the controller, an identity of the labware loaded or unloaded by the bot arm to or from the predetermined labware holding station.

31. The method of claim 29, wherein the predetermined labware holding station is located adjacent to the at least one integrated labware process machine/appliance at load and unload of the labware from the predetermined labware holding station.

32. The method of claim 29, further comprising, effecting, with the controller, a swapping of labware at the predetermined labware holding station, from labware with a first identity in registry to different labware with a second different identity in registry.

33. The method of claim 29, further comprising, moving, with the controller, the labware, loaded in the predetermined labware holding station, along the labware bulk overhead transport path from the at least one integrated labware process machine/appliance to the at least other different, integrated labware process machine/appliance or stand-alone/benchtop instrument, separated at a distance along the labware bulk overhead transport path.

34. The method of claim 29, further comprising, moving, with the controller, the labware, loaded in the predetermined labware holding station, along the labware bulk overhead transport path from the at least one integrated labware process machine/appliance to the at least other different, integrated labware process machine/appliance or stand-alone/benchtop instrument, separated at a distance along the labware bulk overhead transport path and at a different level of the facility.

* * * * *